United States Patent
Abramson et al.

(10) Patent No.: US 11,403,647 B2
(45) Date of Patent: Aug. 2, 2022

(54) SYSTEMS AND METHODS FOR DATA ANALYTICS FOR VIRTUAL ENERGY AUDITS AND VALUE CAPTURE ASSESSMENT OF BUILDINGS

(71) Applicant: Case Western Reserve University, Cleveland, OH (US)

(72) Inventors: Alexis Abramson, Cleveland Heights, OH (US); Roger French, Shaker Heights, OH (US); Ethan Pickering, Cleveland, OH (US); Mohammad Hossain, Cleveland, OH (US); Arash Khalilnejad, Cleveland, OH (US); Rojiar Haddadian, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 85 days.

(21) Appl. No.: 16/409,578

(22) Filed: May 10, 2019

(65) Prior Publication Data
US 2019/0347670 A1      Nov. 14, 2019

Related U.S. Application Data

(60) Provisional application No. 62/669,774, filed on May 10, 2018.

(51) Int. Cl.
*G06Q 30/00*   (2012.01)
*G06F 7/24*    (2006.01)
(Continued)

(52) U.S. Cl.
CPC ............ *G06Q 30/018* (2013.01); *G06F 7/24* (2013.01); *G06F 17/18* (2013.01); *G06N 5/027* (2013.01);
(Continued)

(58) Field of Classification Search
CPC .......... G06Q 30/018; G06Q 10/06315; G06Q 50/163; G06F 7/24; G06F 17/18;
(Continued)

(56) References Cited

U.S. PATENT DOCUMENTS

| 6,785,592 B1 * | 8/2004 | Smith | H02J 3/008 |
| | | | 705/412 |
| 6,968,295 B1 * | 11/2005 | Carr | G06Q 10/06 |
| | | | 709/224 |

(Continued)

FOREIGN PATENT DOCUMENTS

WO    WO-2004029557 A1 *  8/2004  ............... G01D 7/00

OTHER PUBLICATIONS

Hossain, M. A. (2018). Development of buildingmarkers and unsupervised non-intrusive disaggregation model for commercial buildings' energy usage (Order No. 28078448). Available from ProQuest Dissertations and Theses Professional. (2427559398) (Year: 2018).*

(Continued)

*Primary Examiner* — Rutao Wu
*Assistant Examiner* — Tyrone E Singletary
(74) *Attorney, Agent, or Firm* — Quarles & Brady LLP

(57) ABSTRACT

A system may provide virtual energy audits of one or more target buildings. The system may retrieve weather data and energy usage data specific to a given target building from a weather server and a utility server, respectively. The system may store predefined building characteristics corresponding to the given target building in local memory. Based on the weather data, energy usage data, and/or predefined building characteristics, the system may generate one or more building markers that characterize the energy usage and efficiency of the given target building. Building efficiency diagnostics and energy conservation prognostics may be generated based on the building markers and may be sent by the system (Continued)

to be displayed via a user interface of a client device. The energy conservation prognostics may include one or more energy conservation measure recommendations and corresponding predicted cost/energy savings.

37 Claims, 5 Drawing Sheets

(51) Int. Cl.
| | |
|---|---|
| G06F 17/18 | (2006.01) |
| G06Q 50/16 | (2012.01) |
| G06N 5/02 | (2006.01) |
| G06Q 10/06 | (2012.01) |
| G06N 5/04 | (2006.01) |

(52) U.S. Cl.
CPC ......... *G06N 5/04* (2013.01); *G06Q 10/06315* (2013.01); *G06Q 50/163* (2013.01); *Y02P 90/82* (2015.11)

(58) Field of Classification Search
CPC .......... G06N 5/027; G06N 5/04; G06N 5/003; G06N 7/005; G06N 20/20; Y02P 90/82
See application file for complete search history.

(56) References Cited

U.S. PATENT DOCUMENTS

| | | | | |
|---|---|---|---|---|
| 8,583,531 | B2* | 11/2013 | Hirl | G06Q 50/16 705/36 R |
| 9,196,009 | B2* | 11/2015 | Drees | G06Q 50/163 |
| 9,251,472 | B1* | 2/2016 | Li | F24F 11/30 |
| 9,390,388 | B2* | 7/2016 | Drees | G06Q 10/06 |
| 2001/0020219 | A1* | 9/2001 | Kishlock | H02J 3/008 702/61 |
| 2008/0103993 | A1* | 5/2008 | Wilson | G06Q 30/02 705/412 |
| 2012/0278051 | A1* | 11/2012 | Jiang | G06Q 10/04 703/2 |
| 2014/0058572 | A1* | 2/2014 | Stein | H02J 13/00004 700/291 |
| 2015/0276251 | A1* | 10/2015 | Smullin | F24F 11/30 700/276 |
| 2016/0018835 | A1* | 1/2016 | Gaasch | G05F 1/66 700/291 |
| 2019/0302157 | A1* | 10/2019 | Vitullo | G01R 22/063 |

OTHER PUBLICATIONS

Alzetto, F., et al. "Comparison of whole house heat loss test methods under controlled conditions in six distinct retrofit scenarios." Energy and Buildings 168 (2018): 35-41.
Alzetto, F., et al. "QUB: A fast dynamic method for in-situ measurement of the whole building heat loss." Energy and Buildings 174 (2018): 124-133.
Austin, D. "Addressing Market Barriers to Energy Efficiency in Buildings," Working Paper Series, Congressional Budget Office (Aug. 2012).
Bardhan, A., et al. "Energy efficiency retrofits for US housing: Removing the bottlenecks." Regional Science and Urban Economics 47 (2014): 45-60.
Eckard, R. BCC Research, Energy-efficient Technologies for Global Residential Markets Dec. 2017.Report Code: EGY134A.
Case Daily, Advancing lower cost, virtual energy audits, Case Daily. Aug. 9, 2018.
Chou, J.-S., et al. "Time series analytics using sliding window metaheuristic optimization-based machine learning system for identifying building energy consumption patterns." Applied energy 177 (2016): 751-770.
Cover, T.M., et al. "Nearest neighbor pattern classification." IEEE Transactions on Information Theory 13.1, 21-27 (1967).
Farese, P., et al, "A Tool to Prioritize Energy Efficiency Investments," National Renewable Energy Laboratory Technical Report NREL/TP-6A20-54799 (2012).
Fernandez, N., et al., "Impacts of Commercial Building Controls on Energy Savings and Peak Load Reduction." Pacific Northwest National Laboratory, PNNL-25985 (2017).
Fulton, M., et al. "United States Building Energy Efficiency Retrofits: Market Sizing and Financing Models." Deutsche Bank Climate Change Advisors, Frankfurt, Germany (2012).
Gok, A., et al. "Predictive models of poly (ethylene-terephthalate) film degradation under multi-factor accelerated weathering exposures." PloS one 12.5 (2017): e0177614.
Hearst, M. A., et al. "Support vector machines." IEEE Intelligent Systems and their applications 13.4 (1998): 18-28.
Hu, Y., et al. "A nonrelational data warehouse for the analysis of field and laboratory data from multiple heterogeneous photovoltaic test sites." IEEE Journal of Photovoltaics 7.1 (2016): 230-236.
Khalilnejad, A. et al "Data Analytics for Building Energy Audits," a poster presented at the American Society of Material (ASM), Cleveland, Ohio, Nov. 21, 2016.
Klinke, A. G., et al. "A non-destructive method for crack quantification in photovoltaic backsheets under accelerated and real-world exposures." Polymer degradation and stability153 (2018): 244-254.
Mazmanian, E. "An Energy Audit Case Study of Navy Yard Building 101," Consortium for Building Energy Innovation (Jun. 2012).
Meulemans, J., et al. "QUB/e: A Novel Transient Experimental Method for in situ Measurements of the Thermal Performance of Building Fabrics." Building Information Modelling, Building Performance, Design and Smart Construction. Springer, Cham, 2017. 115-127.
Hossain, M. A. et al, "Virtual Energy Diagnostics for Buildings," a poster presented at the Engineering Week Banquet, Case Western Reserve University, Feb. 25, 2016.
Norford, L. K. et al, "Non-intrusive electrical load monitoring in commercial buildings based on steady-state and transient load-detection algorithms," Energy and Buildings 24, 51-64 (1996).
Peshek, T. J., et al. "Insights into metastability of photovoltaic materials at the mesoscale through massive I—V analytics." Journal of Vacuum Science & Technology B, Nanotechnology and Microelectronics: Materials, Processing, Measurement, and Phenomena 34.5 (2016): 050801.
Pickering, E. M. et al, "Data Analytics for Building Energy Disaggregation," SPE Visit 2016, Mar. 14, 2016.
Pickering, E. M. Edifes 0.4: Scalable Data Analytics for Commercial Building Virtual Energy Audits. Diss. Case Western Reserve University, 2016.
Pickering, E. M., et al. "A cross-sectional study of the temporal evolution of electricity consumption of six commercial buildings." PloS one 12.10 (2017): e0187129.
Pickering, E. M., et al. "Building electricity consumption: Data analytics of building operations with classical time series decomposition and case based subsetting." Energy and Buildings 177 (2018): 184-196.
Rhodes, J. D., et al, "Using BEopt (EnergyPlus) with energy audits and surveys to predict actual residential energy usage," Energy and Buildings 86, pp. 808-816 (2015).
Scott, M. "Virtual" Energy Audits, The Daily, Case Western Reserve University, Aug. 8, 2018.
Sleiman, M., et al. "Soiling of building envelope surfaces and its effect on solar reflectance—Part III: Interlaboratory study of an accelerated aging method for roofing materials." Solar Energy Materials and Solar Cells 143 (2015): 581-590.
Toda, H.Y., et al, "Vector autoregression and causality: a theoretical overview and simulation study," Econometric reviews 13.2, 259-285 (1994).
US Department of Energy, "Quadrennial Technology Review 2015", "Chapter 5: Increasing Efficiency of Building Systems and Technologies", https://energy.gov/under-secretary-science-and-energy/quadrennial-technology-review-2015.

(56) References Cited

OTHER PUBLICATIONS

US Department of Energy, Building Technologies Office Multi-Year Program Plan | Department of Energy, (2016). https://www.energy.gov/eere/buildings/downloads/multi-year-program-plan (accessed Aug. 18, 2018). (in two parts due to file size).

US Energy Information Administration, FAQ, How many smart meters are installed in the United States, and who has them?, U. S. Energy Information Administration (EIA). (accessed Aug. 18, 2018). (https://www.eia.gov/tools/faqs/faq.php?id=108&t=3).

Verma, A. K., et al. "Physics-informed network models: a data science approach to metal design." Integrating Materials and Manufacturing Innovation 6.4 (2017): 279-287.

* cited by examiner

SYSTEMS AND METHODS FOR DATA ANALYTICS FOR VIRTUAL ENERGY AUDITS AND VALUE CAPTURE ASSESSMENT OF BUILDINGS

CROSS-REFERENCE TO RELATED APPLICATIONS

This application claims priority to U.S. Provisional Patent Application No. 62/669,774 filed May 10, 2018, which is incorporated by reference in its entirety for all purposes.

STATEMENT REGARDING FEDERALLY SPONSORED RESEARCH OR DEVELOPMENT

This invention was made with government support under the grant DE-AR0000668 awarded by the Department of Energy. The government has certain rights in the invention.

BACKGROUND

Buildings consume about 40% of U.S. energy for uses such as heating, cooling, lighting and electronics. Significant savings are possible in building energy use, and energy-efficiency opportunities can be revealed using energy audits to quantify and understand a building's energy profile. Unfortunately, conventional diagnostic approaches such as energy audits, building automation systems, equipment monitoring, and energy simulation can be expensive or confusing. Such conventional approaches typically involve a physical walk through a building, performing leak tests, infrared imaging, blower door tests, and other procedures. These audits can be expensive and take days to conduct, which often prove disruptive to normal business operations.

Energy is an ever important issue capturing the attention of all major countries. A massive consumer of energy is the building sector where there is significant opportunity to reduce energy waste. The United States uses approximately 100 quads of energy each year, with about 40% attributed to building uses such as heating, cooling, lighting, and electronics.

Considering the long lifetimes and slow replacement rates of buildings, energy retrofits are necessary to appreciably reduce energy consumption in existing building stock. These retrofits typically are identified and quantified in terms of cost and payback time through conventional energy audits or building information modeling. Conventional audits entail a physical walk-through of a building, which can include performing leak tests, infrared imaging, blower door tests, equipment sub-metering, extensive sensing, and more. Therefore, these audits require a team of individuals to survey an entire building, can result in high costs, and can take days to weeks to perform. Further, studies have found that the recommendations from these audits can vary drastically between energy audit companies. Considering the time, cost, and variability in energy recommendations, building managers frequently question the economic benefit and ultimately may refrain from mobilizing their company to conduct conventional energy audits. With building information modeling, one can gain an even deeper understanding of a building's retrofit potential. These physics-based models, such as EnergyPlus, BLAST, DOE-2.1E, TRNSYS-TUD, and ESP-r among others, can assess energy efficiency, but require thousands of inputs. These models are often time-consuming and cumbersome, requiring substantial calibration to historical consumption data through various refinement parameters. Despite the large number of required inputs and other detailed information, various parameters, such as the solar irradiance gain or the convective heat transfer coefficient, frequently deviate (up to 30% from actual values) and result in serious accuracy limitations and varied energy recommendations. Although solutions can be cost-effective and payoff within several years, building efficiency faces great obstacles in implementation. The lack of progress could be blamed on risk aversion and distrust of return-on-investment (ROI) estimates.

Thus, the industry needs a transformational solution to efficiently diagnose problems, build trust in solutions, accelerate their implementation, and validate their future economic return.

SUMMARY

In an example embodiment, a system for providing virtual energy audits may include at least one database memory, an audit tools memory, and a processor of at least one analytics server of the system. The at least one database memory may include a building characteristic database having a record structure that stores a predefined set of building characteristic data corresponding to a target building, a time-series energy usage database having a record structure that stores time-series energy usage data for the target building, and a building marker database having stored thereon building markers associated with building characteristics. The audit tools memory may include a predictive model database having stored thereon least one predictive model, and a building marker function database having stored thereon a set of instructions that implement functions for ascertaining the building markers. The processor of at least one analytics server of the system may be in communication with the database memory and the audit tools memory and may be configured to execute computer-readable instructions stored in the audit tools memory which, when executed by the processor, cause the processor to retrieve weather data corresponding to the target building from a weather server coupled to the at least one analytics server, retrieve energy usage data corresponding to the target building from a utility server coupled to the at least one analytics server, retrieve the predefined set of building characteristic data from the building characteristic database, apply a data frame function to the weather data and the energy usage data to generate a set of variables that include local weather statistics and energy usage statistics corresponding to the target building, identify a plurality of building markers for the target building based on input data including the weather data, the energy usage data, the building characteristic data, and the set of variables, store the plurality of building markers in the building marker database, generate building efficiency diagnostics based on the plurality of building markers, and send the building efficiency diagnostics to be displayed on a user interface of a client device coupled to the at least one analytics server. The building efficiency diagnostics may estimated heating/cooling system characteristics of the target building.

In some embodiments, the computer-readable instructions, when executed by the processor, further cause the processor to pre-process the input data to generate pre-processed input data by generating a first set of tags defining days for which full data of the weather data and the energy usage data is available, identifying and replacing missing values of the input data, detecting and replacing anomalous data points by performing time-series decomposition of the input data to produce a decomposed time series, identifying outliers of the decomposed time series, and removing and replacing the identified outliers, and imputing missing data points from the input data by applying linear imputation to sets of four or fewer consecutive missing data points, and applying a diffusion index analysis based forecasting method to sets of five or greater consecutive missing data points.

In some embodiments, the plurality of building markers may include one or more of a heating/cooling system turn on time building marker, a heating/cooling system turn off time building marker, a heating/cooling system turn on wattage building marker, a diurnal pattern building marker, a rescheduling savings opportunity building marker, an energy usage change building marker, a heating type building marker, a cooling type building marker, a heating/cooling system size building marker, a heating/cooling system oversized condition building marker, one or more building operation patterns building markers, a baseload building marker, a building energy usage intensity building marker, an abnormal energy usage days building marker, an energy usage variability building marker, and/or an effective R-value building marker The estimated heating/cooling system characteristics may be derived, by the processor, from the heating/cooling system turn on time building marker, the heating/cooling system turn off time building marker, the heating/cooling system oversized condition building marker, and the heating/cooling system size building marker.

In some embodiments, the computer-readable instructions, when executed by the processor, may further cause the processor to generate the heating/cooling system turn on time building marker, the heating/cooling system turn off time building marker, and the heating/cooling system turn on wattage building marker by calculating a derivative of the energy usage data to produce a derivative dataset defining changes in energy usage between timestamps of the energy usage data, identify heating/cooling system turn on times from the derivative dataset, identifying heating/cooling system turn off times from the derivative dataset, identifying identify a first mode of the identified heating/cooling system turn on times, identify a second mode of the identified heating/cooling system turn off times, setting the heating/cooling system turn on wattage building marker based on observed energy usage changes occurring at the heating/cooling system turn on times, setting the heating/cooling system turn on time building marker equal to the first mode, and setting the heating/cooling system turn off times equal to the second mode.

In some embodiments, the computer-readable instructions, when executed by the processor, further cause the processor to generate the a diurnal pattern building marker by applying a chi-squared periodogram test to the energy usage data to identify the diurnal pattern.

In some embodiments, the computer-readable instructions, when executed by the processor, further cause the processor to generate the rescheduling savings opportunity building marker by applying an analytical method to the energy usage data to identify when the target building is unoccupied, determining that the heating/cooling system is active when the target building is unoccupied based on the energy usage data, generating a recommendation to adjust a temperature setpoint of the heating/cooling system of the target building, and generating an estimated cost savings associated with adjusting the temperature setpoint according to the recommendation. The analytical method may be selected from of wavelet transform, two sample t-test, and paired t-test.

In some embodiments, the computer-readable instructions, when executed by the processor, further cause the processor to generate the energy usage change building marker by separating the energy usage data into a plurality of single-year subsets, for each year represented in the plurality of single-year subsets, identifying significant change-points of the energy usage data that occurred during that year, determining that a correlation between first and second significant change points of the significant change points is lower than a predetermined threshold, and flagging the first and second significant change points as corresponding to a retrofit time for the target building.

In some embodiments, the computer-readable instructions, when executed by the processor, further cause the processor to generate the heating type building marker and the cooling type building marker by removing datapoints from the energy usage data and the weather data corresponding to holidays and weekends to produce modified energy usage data and modified weather data, applying a piecewise linear regression model to the modified energy usage data and time-series exterior temperature data of the modified weather data to produce a heating season trendline and a cooling season trendline, determining a first slope of the heating season trendline, determining a second slope of the cooling season trendline, comparing the first slope to a first predetermined threshold to determine the heating type of the target building, comparing the second slope to a second predetermined threshold to determine the cooling type of the target building, setting the heating type building marker equal to the determined heating type, and setting the cooling type building marker equal to the determined cooling type.

In some embodiments, the computer-readable instructions, when executed by the processor, further cause the processor to generate the heating/cooling system size building marker by generating the heating/cooling system turn on time building marker, defining a subset of the energy usage data as a set of datapoints corresponding to the heating/cooling system turn on time building marker, determining energy demand values for each of the set of datapoints, determining a mode of the energy demand values, and setting the heating/cooling system size building marker equal to the mode.

In some embodiments, the computer-readable instructions, when executed by the processor, further cause the processor to generate the heating/cooling system oversized condition building marker by identifying a first subset of the energy usage data corresponding to a heating season, identifying a second subset of the energy usage data corresponding to a cooling season, applying a low-pass filter to the first subset to generate a first signal, applying the low-pass filter to the second subset to generate a second signal, generating a first signal-to-noise ratio of the first signal to the first subset, generating a second signal-to-noise ratio of the second signal to the second subset, determining that the first signal-to-noise ratio is less than a first average signal-to-noise ratio corresponding to similar buildings in the heating season, determining that the second signal-to-noise ratio is less than a second average signal-to-noise ratio corresponding to the similar buildings in the cooling season, and setting the heating/cooling system oversized condition building marker to indicate that the heating/cooling system is oversized.

In some embodiments, the computer-readable instructions, when executed by the processor, further cause the processor to generate the one or more building operation patterns building markers by removing data points corresponding to holidays from the energy usage data to produce filtered energy usage data, dividing the filtered energy usage data into seven subsets, each corresponding to a different day of week, determining a minimum length from among the seven subsets, setting lengths of each of the seven subsets equal to the minimum length, performing hierarchical cluster analysis on the seven subsets to produce a cluster dendrogram, determining that a ratio of a maximum height of the cluster dendrogram to a minimum height of the cluster dendrogram is less than or equal to a predetermined threshold, and setting the building operation patterns building marker to indicate a pattern corresponding to the predetermined threshold.

In some embodiments, the computer-readable instructions, when executed by the processor, further cause the processor to generate the baseload building marker by applying a low-pass filter to the energy usage data to produce filtered energy usage data, identifying daily minimum energy usage values from the filtered energy usage data, sort the daily minimum energy usage values by magnitude to produce sorted daily minimum energy usage values, removing any anomalous and/or negative valued data points from the sorted daily minimum energy usage values to produce cleaned, sorted daily minimum energy usage values, calculating an average of a predetermined number of lowest values of the cleaned, sorted daily minimum energy usage values, and setting the baseload building marker equal to the average.

In some embodiments, the computer-readable instructions, when executed by the processor, further cause the processor to generate the building energy usage intensity building marker by, setting the energy usage intensity building marker equal to an amount of energy used per square foot per year value based on the energy usage data and the predefined set of building characteristic data, and comparing the energy usage intensity building marker to an average energy usage intensity building marker corresponding to a set of buildings. A first climate zone of the set of buildings and a second climate zone of the target building may be the same, and a first building type of the set of buildings and a second building type of the target building may be the same.

In some embodiments, the computer-readable instructions, when executed by the processor, further cause the processor to generate the abnormal energy usage days building marker by dividing the energy usage data into subsets, applying hierarchical clustering to the subsets to produce cluster data, identifying abnormal days corresponding to outlier energy usage based on the cluster data, and flagging the identified abnormal days.

In some embodiments, the computer-readable instructions, when executed by the processor, further cause the processor to generate the energy usage variability building marker by generating a summer boxplot from first datapoints of the energy usage data corresponding to a summer time period, generating a winter boxplot from second datapoints of the energy usage data corresponding to a winter time period, generating a set of contiguous box plots for each hour represented in the summer boxplot and the winter boxplot, and calculating a smooth mean of energy usage values for each hour in both summer and winter.

In some embodiments, the computer-readable instructions, when executed by the processor, further cause the processor to generate the effective R-value building marker by disaggregating the energy usage data into an heating/cooling dataset and a load dataset, determining an interior heating load for a selected time period based on the load dataset, determining an amount of energy being removed from air-conditioned space of the target building based on the heating/cooling dataset for the selected time period, determining an exterior temperature of the target building for the selected time period based on the weather data, estimating the interior temperature of the target building for the selected time period within a predetermined range, and setting the effective R-value building marker corresponding to a thermal insulation quality of the target building based on the amount of energy being removed, the interior heating load, the exterior temperature, and the interior temperature. The selected time period may correspond to a time period during which an interior temperature of the target building is substantially unchanging.

In some embodiments, the computer-readable instructions, when executed by the processor, further cause the processor to generate prognostics data based on the input data, the prognostics data including energy conservation measure recommendations and estimated impacts of implementing the energy conservation measure recommendations, generate energy conservation prognostics based on the prognostics data and the plurality of building markers, and send the energy conservation prognostics to be displayed on a the user interface of the client device.

In some embodiments, the prognostics data is generated by processing the weather data and the energy usage data using at least one predictive model. The at least one predictive model may be selected from a neural network model, a random forest model, a support-vector machine model, GBRT model, and a diffusion index model.

In some embodiments, the computer-readable instructions, when executed by the processor, further cause the processor to generate the energy conservation prognostics by generating a recommendation for an energy conservation measure corresponding to an action that could be taken to improve energy efficiency of the building, identified based on at least one of the building markers, generating a prediction of an effect the energy conservation measure would have on the energy efficiency of the building, and sending the recommendation and the prediction to be displayed at the user interface of the client device.

In some embodiments, the at least one of the building markers includes the effective R-value building marker.

In an example embodiment, a method for providing virtual energy audits may include steps for retrieving, by a processor of an analytics server, weather data corresponding to at least one target building from a weather server coupled to the analytics server, receiving, by the processor, utility energy usage data corresponding to the at least one target building, obtaining a set of building-specific characteristic data corresponding to the at least one target building, combining the weather data, utility energy usage data, and building-specific characteristic data into an energy audit dataset, determining a plurality of building markers for the at least one target building based on the energy audit dataset, generating prognostics data based on the energy audit dataset and building markers, the prognostics data including energy conservation recommendations and estimated impacts of implementing the energy conservation recommendations, generating building efficiency diagnostics based on the plurality of building markers, and sending the building efficiency diagnostics and the energy conservation recommendations to be displayed on a user interface of a client device coupled to the analytics server. The building efficiency diagnostics may include estimated heating/cooling system characteristics of the at least one target building.

In some embodiments, the plurality of building markers include one or more of a heating/cooling system turn on time building marker, a heating/cooling system turn off time building marker, a heating/cooling system turn on wattage building marker, a diurnal pattern building marker, a rescheduling savings opportunity building marker, an energy usage change building marker, a heating type building marker, a cooling type building marker, a heating/cooling system size building marker, a heating/cooling system oversized condition building marker, one or more building operation patterns building markers, a baseload building marker, a building energy usage intensity building marker, an abnormal energy usage days building marker, an energy usage variability building marker, and/or an effective R-value building marker.

In some embodiments, the method may further includes steps for pre-processing the energy audit dataset to generate a pre-processed energy audit dataset by generating a set of tags defining days for which full data of the weather data and the energy usage data is available, identifying and replacing missing values of the energy audit dataset, detecting and replacing anomalous data points by, performing time-series decomposition of the energy audit dataset to produce a decomposed time series, identifying outliers of the decomposed time series, and removing and replacing the identified outliers from the energy audit dataset, imputing missing data points from the energy audit dataset by applying linear imputation to sets of four or fewer consecutive missing data points, and applying a diffusion index analysis based forecasting method to sets of five or greater consecutive missing data points.

In some embodiments, the at least one target building may include a plurality of target buildings. The building efficiency diagnostics may include a plurality of subsets of building efficiency diagnostics. The energy conservation recommendations may include a plurality of subsets of energy conservation recommendations. Each of the plurality of target buildings may correspond to a respectively different subset of building efficiency diagnostics of the plurality of subsets of building efficiency diagnostics. Each of the plurality of target buildings may correspond to a respectively different subset of energy conservation recommendations of the plurality of subsets of energy conservation recommendations. The method may further include steps for quantifying a respective savings opportunity value for each of the plurality of target buildings to produce a plurality of savings opportunity values, the energy conservation recommendations including the plurality of savings opportunity values, generating an ordered list of the plurality of target buildings that is ordered based on the plurality of savings opportunity values, identifying a subset of target buildings of the plurality of target buildings associated with the highest savings opportunity values of the plurality of savings opportunity values, and sending the ordered list and the identified subset of target buildings to be displayed via the user interface of the client device.

In some embodiments, each of the weather data and the set of building-specific characteristic data may be generated off-site from the at least one target building. The energy usage data may be generated only by at least one meter of the at least one target building.

In some embodiments, the building-specific characteristic data may be limited to one or more of building square footage, number of stories of the at least one target building, geographic location of the at least one target building, and/or an aspect ratio of the at least one target building determined from square footage and number of stories of the at least one target building.

In some embodiments, the method may further include steps for obtaining a building owner's consent to receive utility data, and obtaining at least one year of utility energy usage data directly from one or more providers of energy services for the at least one target building.

BRIEF DESCRIPTION OF THE DRAWINGS

The present invention will hereafter be described with reference to the accompanying drawings, wherein like reference numerals denote like elements.

The patent or application file contains at least one drawing executed in color. Copies of this patent or patent application publication with color drawing(s) will be provided by the Office upon request and payment of the necessary fee.

DETAILED DESCRIPTION

Figure 1:
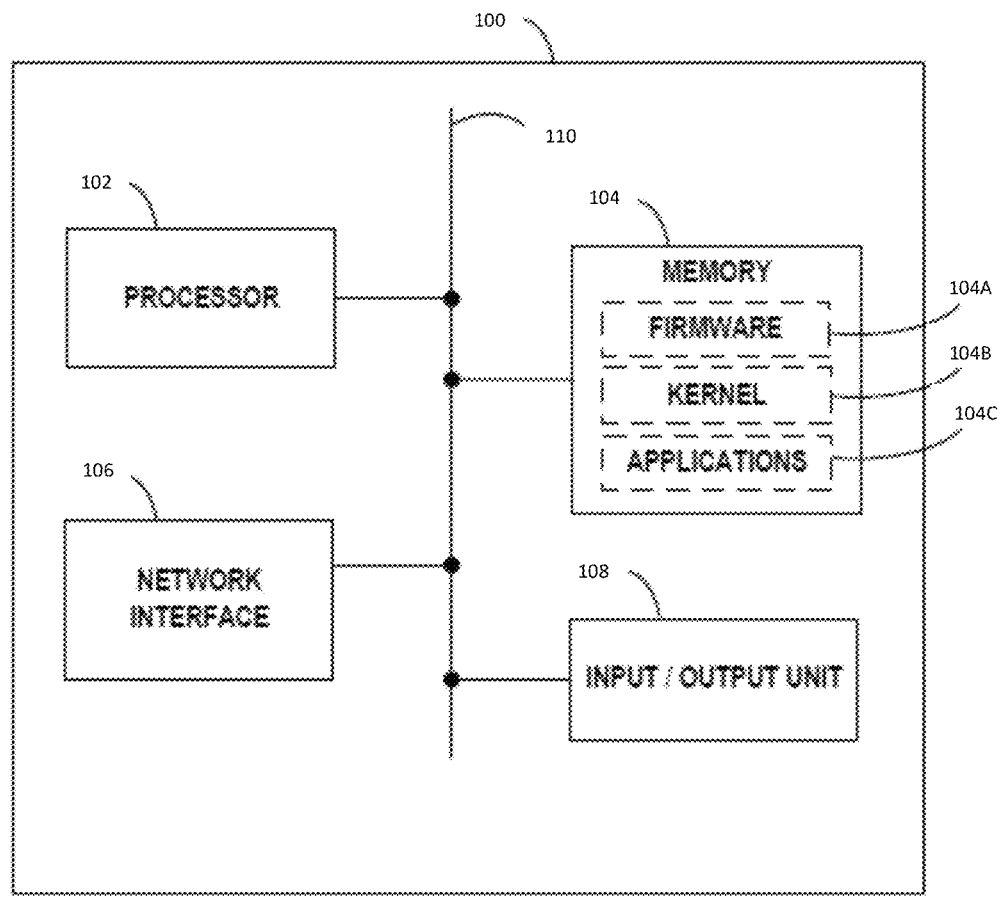
FIG. 1 is an illustrative block diagram of a computer system that may execute some or all of the method of FIG. 4, in accordance with example embodiments.

Before any embodiments of the disclosed subject matter are explained in detail, it is to be understood that the disclosed subject matter is not limited in its application to the details of construction and the arrangement of components set forth in the following description or illustrated in the following drawings. The disclosed subject matter is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the disclosed subject matter. Various modifications to the illustrated embodiments will be readily apparent to those skilled in the art, and the generic principles herein can be applied to other embodiments and applications without departing from embodiments of the disclosed subject matter. Thus, embodiments of the disclosed subject matter are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosed subject matter. Skilled artisans will recognize the examples provided herein have many useful alternatives and fall within the scope of embodiments of the disclosed subject matter.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a system or server device (e.g., a device that provides computational services to client devices), or some other type of computational platform. Some server devices may operate as client devices from time to time in order to perform particular operations, and some client devices may incorporate server features. The computing device 100 may, for example, be used to execute (e.g., via the processor 102 thereof) may be configured to execute, in whole or in part, the method of FIG. 4.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 100 may include fixed memory as well as one or more removable memory units, the latter including but not limited to various types of secure digital (SD) cards. Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
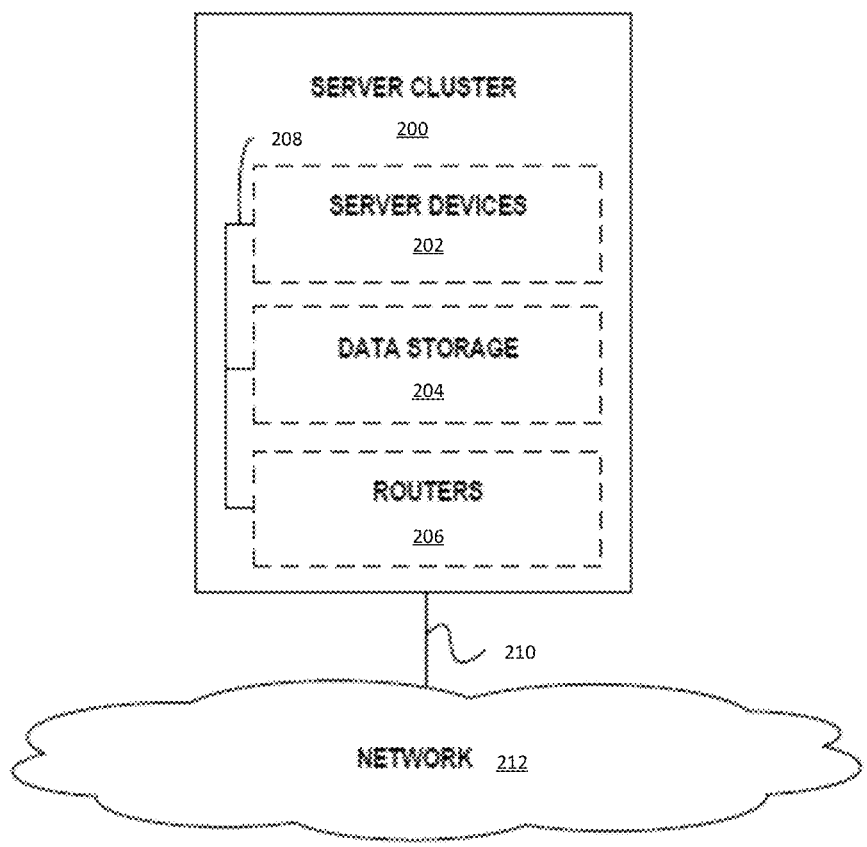
FIG. 2 is an illustrative block diagram of a server cluster that may execute some or all of the method of FIG. 4, in accordance with example embodiments.

FIG. 2 depicts a cloud-based server cluster 200 in accordance with example embodiments. In FIG. 2, operations of a computing device (e.g., computing device 100 of FIG. 1) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200 (e.g., the execution and/or training of machine learning models and/or algorithms, the calculation of feature data such as persistent homology barcodes or MWCGs, and other applicable computing tasks/applications). The server cluster 200 may, for example, be configured to execute (e.g., via computer processors of the server devices 202 thereof), in whole or in part, the method of FIG. 4.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Python, PHP Hypertext Preprocessor (PHP), Active Server Pages (ASP), JavaScript, and/or other languages such as C++, C #, or Java. Computer program code written in these languages may facilitate the providing of web pages to client devices, as well as client device interaction with the web pages.

Implementation of Building Virtual Energy Audit System

Below is described one implementation for a system that provides a virtual energy audit for a building (commercial building or residential structure). Systems disclosed herein are able to audit energy consumption of a building with the only building-specific data necessary to be collected on an ongoing basis being utility meter data (other data used, such as weather data and information concerning the location of the building are obtained from public sources). By limiting the required data from users and their buildings, the techniques described herein are easier and less intrusive than other techniques. Yet, the systems and techniques disclosed herein still provide superior results in terms of accuracy of audits and modeling of building energy usage (e.g., Sometimes referred to as electricity usage or electricity consumption), and key predictions, diagnostics and recommendations. For example, systems using certain techniques disclosed herein can assess heating/cooling system load and schedule or effective building R-value (insulation) of a building, and make detailed recommendations to building owners regarding how these attributes of their building can be improved to reduce energy usage and precisely how much money making those improvements would save the user over a year (or other preferred timeframe)—all without requiring any on-site thermal scans, blower tests, sensor installations, inspections, extensive surveys, or other intrusive data gathering. It should be understood that the following description of operation and network architecture for such systems is illustrative only—subsequent sections herein describe alternative embodiments and implementations.

Figure 3:
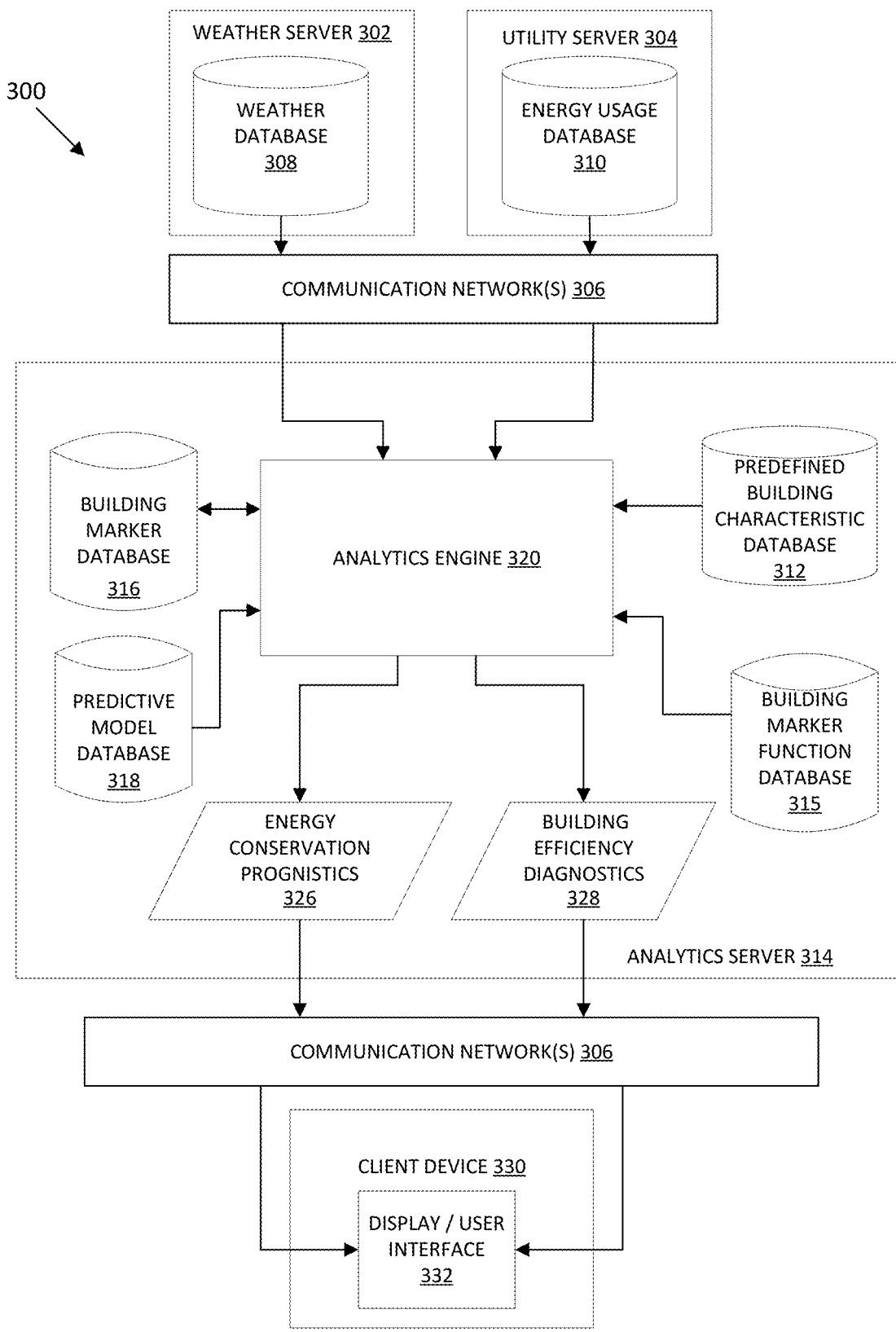
FIG. 3 is an illustrative block diagram of a network of computer systems including an analytics server that retrieves and processes weather data and energy usage data corresponding to a building to produce energy conservation prognostics and building efficiency diagnostics for that building, in accordance with example embodiments.

FIG. 3 shows an illustrative network 300 that includes a weather server 302, a utility server 304, one or more communications networks 306, an analytics server 314, and a client device 330. The analytics server 314 may, for a given building, perform a virtual energy audit of the building and predictively calculate future energy usage for the building via analysis of multiple time-series datastreams (e.g., including time-series weather data and time-series energy usage data) using an analytics engine 320 (e.g., which may be implemented via one or more processors of the analytics server 314). Additionally, the analytics server 314 may diagnose building efficiency or equipment issues via this analysis, and may generate suggested solutions for these issues based on predicted performance. In some embodiments, these analyses may be performed by the analytics server 314 without needing an auditor to set foot in the building being analyzed, which is necessary in many or all conventional building energy auditing methods. To provide a few examples, the virtual energy audits generated by the analytics server 314 may be used as a basis for equipment providers and contractors to illustrate replacement equipment value, for utility companies to measure the impact of their energy efficiency programs, and for financiers to evaluate potential risks and opportunities of investments in energy efficiency.

The analytics engine 320 may be coupled to various internal and external databases, including a weather database 308 stored on a memory (e.g., a database memory) of the weather server 302, an energy usage database 310 (sometimes referred to as electricity usage database 310) stored on a memory (e.g., a database memory) of the utility server 304, a predefined building characteristic database 312 that may be stored in a local memory (e.g., on a local database memory) of the analytics server 314, a building marker database 316 that may be stored in the local memory, a building marker function database 315 that may be stored in the local memory, and a predictive model database 318 that may be stored in the local memory. The analytics engine 320 may output energy conservation prognostics 326 and/or building efficiency diagnostics 328, which may be sent to the client device 330 to be stored on a memory thereof and/or to be displayed at a display/user interface (UI) 332 thereof. The energy usage database 310 may be a time-series energy usage database having a record structure that stores time-series energy usage data for one or more buildings. The building characteristic database 312 may include a predefined set of building characteristics data corresponding to one or more buildings. In some embodiments, the predictive model database and the building marker function database may be stored in an audit tools memory.

As shown, the analytics server 314 may be communicatively coupled to the weather database 308 and the energy usage database 310 of the weather server 302 and the utility server 304, respectively, via the one or more communication networks 306. The analytics server 314 may also be communicatively coupled to the client device 330 via the one or more communication networks 306. The communication network(s) 306 may include one or more local area networks (LANs), wide area networks (WANs) such as the internet, and/or personal area networks (PANs), for example. It should be understood that, while not shown here, various computer network devices such as hubs, switches, and/or routers may be interposed along the data path between the analytics server 314 and the weather server 302, between the analytics server 314 and the weather server 304, and between the analytics server 314 and the client device 330.

For a given building (referred to hereafter as the "audited building" or a "target building") being audited/analyzed by the analytics server 314, the analytics engine 320 may retrieve weather data (e.g., time-series weather data covering one or more time periods) for a local region corresponding to the audited building from the weather database 308 via the communication network(s) 306, may retrieve energy usage data (e.g., time-series energy usage data covering one or more time periods) corresponding to the audited building (e.g., measured by one or more meters coupled to electrical systems of the audited building) from the energy usage database 310, and may retrieve a set of predefined building characteristics corresponding to the audited building from the predefined building characteristic database 312.

The weather server 302 may be, for example, associated with a weather station that is nearby and/or a geographic region that includes the audited building. For example, the weather database 308 may include time-series datastreams for each of a number of weather variables (e.g., which may include outdoor/ambient temperature, wind speed, relative humidity, solar irradiance, global horizontal irradiance, precipitation, dew point, and/or other applicable weather variables) for a geographic region associated with the audited building. The weather database 308 may include historical weather data for each of the weather variables, which may span several years.

The utility server 304 may be, for example, associated with a utility provider (e.g., a power/electricity provider) that provides electricity to the audited building. For example, the energy usage database 310 may include one or more time-series datastreams corresponding to energy usage (e.g., electricity usage measured in kilowatt hours (kWh)) of the audited building over time. The energy usage database 310 may include historical energy usage data defining the energy usage of the building over various periods, which may span several years in some instances.

The predefined building characteristic database 312 may, for example, be stored in a local memory device of the analytics server 314. The predefined building characteristic database 312 may be populated with predefined building characteristic data that is defined via user input (e.g., which may be provided via user interaction with the display/UI 332 of the client device 330). For example, a user may be prompted at the display/UI 332 to input a number of building characteristics, which may include but are not limited to square footage of the audited building, the number of floors of the audited building, the geographic region of the audited building, the building type (e.g., office, lab, warehouse, residence, retail store, etc.), and the aspect ratio of the audited building (e.g., thin spire, flat pancake, etc.). In some embodiments, the analytics engine 320 may estimate the aspect ratio of the audited building based on the number of floors of the audited building and the square footage of the audited building.

The analytics engine 320 may retrieve weather data, energy usage data, and predefined building characteristic data corresponding to the audited building from the weather database 308, the energy usage database 310, and the predefined building characteristic database 312, respectively, which may be cumulatively referred to as "input data." The analytics engine 320 may then execute a number of functions and scripts (e.g., which may be stored as computer-readable instructions on the local memory device of the analytics server 314) to preprocess and analyze the input data to generate the energy conservation prognostics 326 and the building efficiency diagnostics 328.

For example, the analytics engine 320 may execute a weather addition function to combine the weather data with the energy usage data of the input data.

For example, the analytics engine 320 may execute a dataframe function to calculate derived variables and/or statistics from the energy usage data (e.g., energy usage statistics and/or energy usage variables) and the weather data (e.g., to calculate weather statistics and/or weather variables). For example, the derived variables may include, for each day for which data is available, one or more of: the change in energy consumption over 15 minute intervals, the change in outside temperature over 15 minute intervals, change in relative humidity (RH) over 15 minute intervals, a weekday or weekend operation tag for that day, a working day or holiday tag for that day, maximum instantaneous energy consumption for that day, minimum instantaneous energy consumption for that day, mean energy consumption for that day, energy consumption range for that day, maximum outside temperature for that day, minimum outside temperature for that day, mean outside temperature for that day, outside temperature range for that day, temperature 30 minutes before each timestamp, maximum temperature of the previous day, minimum temperature of the previous day, mean temperature of the previous day, temperature range of the previous day, maximum RH for that day, minimum RH for that day, mean RH for that day, RH range for that day, RH 30 minutes before, maximum RH of the previous day, mean RH of the previous day, minimum RH of the previous day, and RH range of the previous day.

For example, the analytics engine 320 may execute an occupancy_addition script to apply an occupancy curve to the input data. The occupancy curve identifies occupied and unoccupied hours for the audited building on business and non-business days.

For example, the analytics engine 320 may execute an on_off_tagging function that interpolates between 15 minute energy changes (e.g., based on the variable describing the change in energy consumption over 15 minute intervals) to estimate turn on times (e.g., the time at which the majority of electrical systems in the audited building are turned on), turn off times, and turn on wattages (e.g., the instantaneous energy consumption at the time the system is turned on for each day for which energy usage data is available (e.g., which may be quantified and stored as a heating/cooling system turn on time building marker, a heating/cooling system turn off time building marker, and a heating/cooling system turn on wattage building marker, respectively in the building marker function database 316).

For example, the analytics engine 320 may execute a seven_day_statistics function that generates weather statistics for the most recent 7 days. For example, the weather statistics may include minimum, first quartile, median, third quartile, maximum, and mean values and/or other applicable statistics for one or more of temperature, relative humidity, precipitation, and other applicable (i.e., measurable) weather characteristics.

For example, the analytics engine 320 may execute a sun_tagging function that generates tags defining the sunrise and sunset times for each day (e.g., based on the weather data).

For example, the analytics engine 320 may execute a fullday_tagging function that generates tags for days having full data available. For example, a day may be considered to have full data available if there is no missing time-series weather data or energy usage for that day.

For example, the analytics engine 320 may execute a correlation_analyzer function that, for a given day, subsets various times of day (e.g., over time periods of predetermined size, such as hourly time periods, time periods of four hours, or any other applicable time periods) and provides a respective correlation between (e.g., corresponding to the level of linear association between) weather data (e.g., weather variables derived from the weather data) and energy usage for each of the subsets. For example, for each subset, a correlation between energy usage and ambient/outdoor temperature (over the corresponding time period) may be calculated, a correlation between energy usage and relative humidity may be calculated, a correlation between energy usage and wind speed may be calculated, a correlation between energy usage and solar irradiance may be calculated, and/or a correlation between energy usage and dew point may be calculated.

For example, the analytics engine 320 may execute a thermal_analyzer function, which determines the R-value and thermal mass of the audited building based on the energy usage data. The "R-value," as used here, represents a measure of insulative and permeable (e.g., thermally insulative and resistance to air infiltration) properties of the audited building. R-value is determined by application of an energy balance on the building during steady state time periods and subsequent analysis of the relative change in energy usage due to variations in exterior temperature. The thermal mass is determined via application of an energy balance and by analyzing periods in time when the exterior temperature changes significantly in time and assessing the magnitude of the corresponding energy changes in the building.

For example, the analytics engine 320 may execute a thermal_analyzer_steam function, which determines the R-value and the thermal mass of the audited building based on steam data for the building. For example, in some embodiments, the analytics engine 320, in addition to the weather data and energy usage data, may retrieve time-series steam usage data from an external server (not shown) from which the R-value and thermal mass may be calculated using the thermal_analyzer_steam function.

For example, the analytics engine 320 may execute a prediction_svm script, which may use a support vector machine (SVM) model to predict the energy usage of the building over a future time period based on the energy usage data and the weather data. SVM is a non-parametric machine learning algorithm that may be applied to fit a regression curve to the energy usage data from related variables such as time of day, day of the week, weather variables and/or statistics, etc. For example, the SVM model may be retrieved from the predictive model database 318 (e.g., which may be stored in local memory of the analytics server 314) when executing the prediction_svm script.

For example, the analytics engine 320 may execute a prediction_rf script, which may use a random forest model to predict the energy usage of the building over a future time period based on the energy usage data and the weather data. Random forest is a machine learning algorithm that may be applied to fit a regression curve to the energy usage data based on ensemble learning (e.g., majority vote) from multiple iterations of decision trees developed from related variables such as time of day, day of the week, weather variables and/or statistics, etc. For example, the random forest model may be retrieved from the predictive model database 318 when executing the prediction_rf script.

For example, the analytics engine 320 may execute of f_missing_data function to find missing values in the time-series input data and replace them for time-series continuity. For example, replacement of missing values in the time-series data may be performed via execution of the imputation function described below.

For example, the analytics engine 320 may execute a day_data function to identify which days of the time-series input data correspond to business days (e.g., days on which the audited building is open for business, which may exclude certain holidays and/or certain days of the week such as weekends). For example, the analytics engine may identify non-holiday weekdays as business days, and may identify holidays and weekends as non-business days.

For example, the analytics engine 320 may execute a mean_shifts function to determine integer mean shift in the energy usage data due to meter faults. For example, the analytics engine 320 may calculate daily mean energy use for each day represented in the energy usage data, and may identify pairs of consecutive days between which a sufficiently large (e.g., above a predetermined threshold) shift in mean energy usage occurs.

For example, the analytics engine 320 may execute a meter_res function to determine the resolution of the meter (e.g., the power meter that detects energy usage for the audited building) based on the energy usage data.

For example, the analytics engine 320 may execute an anom_fix function to detect and replace anomalous data points of the input data. For example, the analytics engine may decompose the time-series energy usage data, may identify outliers of the decomposed time-series (e.g., using the tsoutliers function of the "R" programming language), and may remove and replace the identified outliers. For example, the analytics engine 320 may replace the identified outliers via linear or non-linear interpolation. In some embodiments, the analytics engine 320 may replace the identified outliers by executing the imputation function.

For example, the analytics engine 320 may execute an imputation function to impute missing data points in the time-series input data. For example, the analytics engine 320 may apply linear imputation if imputing a set of four or fewer consecutive missing data points. If more than four consecutive data points are missing, the analytics engine 320 may instead apply a forecasting method based on diffusion index analysis (e.g., combined with weather variables of temperature and RH) to impute the missing data points. For example, the analytics engine 320 may correlate the energy usage data with corresponding forecast weather variables/statistics derived from the weather data. The analytics engine may then use multivariate time series analysis to predict future energy usage based on the forecast weather variables/statistics.

For example, the analytics engine 320 may execute a building_summary function to generate a summary of building metadata for the audited building. For example, the summary of building metadata may identify any identified anomalies and missing portions of the time-series energy usage data.

For example, the analytics engine 320 may execute a *_reader function to restructure the input data. For example, the analytics engine may reformat the timestamps of the input data to a standard format, and may provide derivative variables based on the energy usage data, which may include business/non-business times, sunrise/sunset times, day of week, weekday/weekend, power demand, and other applicable variables.

For example, the analytics engine 320 may execute a cleaning_criteria function to verify whether the input data meets predefined criteria and, if necessary, to adjust the input data to meet the predefined criteria. As an illustrative example, the criteria may require that the audited building be located in North America, may require that the time-series data of the input data has a resolution of 15 minutes or less, may require that one continuous year with no more than 5 continuous missing days is included in the time-series data of the input data, may require that fewer than 10% of the data points of the time-series energy usage data are missing or zero, may require that the first seven days of the time-series data of the input data have four or fewer consecutive missing data points, and may require that at least one continuous year with fewer than 5% anomalous data points is included in the time-series data of the input data. One or more of the required criteria for the audited building may be identified using building markers of the building marker database 316, as will be described. For example, each building marker of the building marker database associated with a given building may be derived from weather data, building characteristic data and/or energy usage data associated with the given building via the application of one or more building marker functions. With the exception of the geographic location requirement, the input data may be adjusted until each criterion is met. For example, this adjustment may be performed by identifying and selecting only a subset of the overall input data that "best" meets the above criteria for further analysis.

For example, the analytics engine 320 may execute core_meta and core_util functions to perform a variety of tasks including finding the coordinates/location of data in memory, adjusting timestamps of the input data as needed, extracting the year, month, and day from data points of the input data, creating a core power demand column by subtracting energy usage per hourly time interval, and finding the most frequent interval between time stamps of the input data (e.g., identifying all time intervals elapsed between timestamps, counting the number of occurrences of each unique time interval of the identified time intervals, and identified the most frequently occurring time interval of the identified time intervals).

For example, the analytics engine 320 may execute a noaa function to retrieve the weather data from one or more weather servers (e.g., the weather server 302). For example, the weather server 102 may be a File Transfer Protocol (FTP) server associated with the National Oceanic and Atmospheric Administration, or another local or national meteorological organization.

For example, the analytics engine 320 may execute a Systemfinder function to determine the turn on and turn off times and the turn on wattage of one or more heating/cooling systems, which may include a heating, ventilation, and air conditioning (HVAC) system and/or or other similar systems, such as water heater systems, refrigeration systems, and the like of the audited building (e.g., which may be quantified and stored as one or more heating/cooling system turn on time building markers and one or more heating/cooling system turn off time building markers, respectively in the building marker database 316). For example, the analytics engine 320 may take a derivative of the time-series energy usage data as the change in energy usage between timestamps (e.g., data points) to produce a derivative dataset. The analytics engine 320 may then find changes in the mean and variance for the derivative dataset. The analytics engine 320 may then plot the derivative values by the time of day that they occurred vs. the date of occurrence and return the data frame of the turn on time schedule or the turn off time schedule observed as having occurred most frequently (i.e., the mode). For example, all heating/cooling system turn on times and turn off times present in the energy usage data may be identified by the analytics engine 320, and the turn on time occurring most frequently may be identified as the "regular" turn on time (e.g., which may be set as the HVAC system turn on time building marker) for the HVAC system and/or the other similar systems, and the turn off time occurring most frequently may be identified as the "regular" turn off time (e.g., which may be set as the HVAC system turn off time building marker) for the HVAC system and/or the other similar systems. The turn on wattage of the heating cooling system(s) may be determined by identifying the instantaneous energy usages at the turn on times. In some embodiments, the mode of the instantaneous energy usages (e.g., the most frequently occurring value of the instantaneous energy usages) may be identified as the turn on wattage. Alternatively, an average of the instantaneous energy usages may be calculated and identified as the turn on wattage.

For example, the analytics engine 320 may execute an Ext_light_finder function to identify turn on/turn off times of exterior lights of the audited building. For example, the analytics engine 320 may take a derivative of the time-series energy usage data as the change in energy between timestamps (e.g., data points) to produce a derivative dataset. The analytics engine 320 may then find changes in the mean and variance for the derivative dataset. The analytics engine 320 may then plot the derivative values by the time of day that they occurred vs. the date of occurrence and may return the data frame of the turn on time schedule or the turn off time schedule observed as having occurred most frequently (i.e., the mode).

For example, the analytics engine 320 may execute a Chisquare_periodogram function to detect a "circadian rhythm" in the energy usage data for the audited building (e.g., which may be quantified and stored as one or more diurnal pattern building markers in the building marker database 316). Here, the "circadian rhythm" refers to a diurnal cycle/pattern of energy usage of the audited building (i.e., any pattern of energy usage of the audited building that recurs every 24 hours). For example, a chi-squared periodogram test may be applied to the energy usage data by the analytics engine 320 to detect the diurnal pattern of the energy usage data.

For example, the analytics engine 320 may execute a Forecast function to create a prediction/forecast of energy usage of the audited building for a given period of time (e.g., 6 months) under a given set of conditions using a diffusion index approach. For example, the analytics engine 320 may use a diffusion index approach that relies on the energy usage data (e.g., historical energy usage data) for the audited building and weather variables (e.g., temperature, wind speed, and relative humidity) derived from the weather data (e.g., historical weather data) as inputs. For example, the set of conditions may correspond to changes in the operation of or the retrofitting of one or more systems of the audited building. For example, the output of the Forecast function may include predicted cost savings and/or predicted energy savings that may be achieved by following the recommendations associated with the set of conditions.

For example, the analytics engine 320 may execute a Forecast-ml function to create a prediction/forecast of energy usage of the audited building for a period of time (e.g., one week) under a given set of conditions using a neural network approach. For example a multi-layer perceptron neural network (MLP-NN) may be implemented for the prediction of future energy usage of the audited building. For example, the MLP-NN may take as inputs feature vectors including variables derived from the energy usage data and the weather data. The MLP-NN may be trained specifically for the prediction of energy usage of a building based on historical energy usage for that building and historical weather data associated with that building. In alternate embodiments, a gradient-boosted regression trees (GBRT) algorithm may be applied instead of the MLP-NN to predict energy usage of the audited building given the defined circumstances. For example, the set of conditions may correspond to changes in the operation of or the retrofitting of one or more systems of the audited building. For example, the output of the Forecast-ml function may include predicted cost savings and/or predicted energy savings that may be achieved by following the recommendations associated with the set of conditions.

For example, the analytics engine 320 may execute a reschedule function to identify energy savings opportunities for the audited building by rescheduling operation of one or more systems of the audited building (e.g., including the heating/cooling system and/or similar systems of the audited building) (e.g., which may be quantified and stored as one or more rescheduling savings opportunity building markers in the building marker database 316). For example, the analytics engine 320 may use a two sample t-test and/or a paired t-test (e.g., applied to a weekday subset of the energy usage data and a weekend subset of the energy usage data) to identify when the building is unoccupied. In some embodiments, wavelet transformation may be applied instead of the two sample t-test and/or the paired t-test, which may, at least temporarily, filter out high level noise and shift filtered energy usage. The analytics engine 320 may recommend then "rescheduling" or otherwise adjusting temperature set points of the HVAC system of the audited building to be higher or lower when the audited building is unoccupied, depending on ambient temperature (e.g., a lower temperature setpoint would be established when unoccupied when ambient temperatures are low/below a predetermined threshold; a higher temperature setpoint would be established when unoccupied when ambient temperatures are high/above a predetermined threshold).

For example, the analytics engine 320 may execute a ChangeBehaviors function to identify significant changes in the pattern of energy usage of the audited building (e.g., which may be quantified and stored as one or more building markers in the building marker database 316). For example, the analytics engine 320 may subset the energy usage data according to year. Then, the analytics engine 320 may find significant change-points of the energy usage data for each year. Then, if a strong correlation (e.g., exceeding a predetermined threshold) exists between significant change-points across years and/or between significant change-points and weather data change-points, then some or all of the significant change-points for which such strong correlations are identified may be ignored. Otherwise, if such strong correlations are not identified for at least a portion of the significant change points, those significant change-points may be flagged and identified by the analytics engine 320. For example, if a significant change point is detected, then the corresponding time stamp may be flagged as corresponding to a "retrofit" time for the audited building.

For example, the analytics engine 320 may execute a HVAC_type function to detect the heating type (e.g., electric or non-electric) and cooling type (e.g., electric or not present) of the HVAC system of the audited building (e.g., which may be quantified and stored as a one or more heating type building markers and one or more cooling type building markers, respectively, in the building marker database 316). For example, the analytics engine 320 may first remove weekends and holidays from the input data to produce modified input data that includes modified time series weather data and modified time-series energy usage data. Next, the analytics engine 320 may apply a piecewise linear regression model to the modified time series energy usage data vs. the exterior temperature data of the modified time-series weather data to produce two linear regression trendlines, one for the heating season and one for the cooling season. The analytics engine 320 may then identify the value of the slopes (e.g., rate of change) of the linear regression trendlines, and based on these slopes may identify the heating type and/or the cooling type of the HVAC system of the audited building, respectively, based on the heating season slope and the cooling season slope (e.g., by comparing the heating season slope to a first predetermined threshold and by comparing the cooling season slope to a second predetermined threshold).

For example, the analytics engine 320 may execute a noise_filter function to detect whether the HVAC system of the audited building is "oversized" or "right-sized" (e.g., which may be quantified and stored as one or more HVAC system oversized condition building markers in the building marker database 316). For example, an HVAC system may be considered oversized if the HVAC system does not have to run for a sufficiently long time (e.g., over a predetermined threshold) before a temperature setpoint for the audited building is hit and the HVAC system is shut off. The HVAC system may otherwise be considered right-sized, at least for the purposes of the present example. For example, the analytics engine 320 may identify cooling and heating seasons (e.g., based on the weather data) and may subset the energy usage data accordingly (e.g., dividing the energy usage data into cooling season energy usage data and heating season energy usage data). The analytics engine 320 may then apply a 3rd order Butterworth filter, to each set of energy usage data to produce first and second signals. The analytics engine 320 may then apply a noise filter to the output of the Butterworth filter to separate noise from the actual energy usage data. The analytics engine 320 may then calculate the ratio (e.g., signal-to-noise ratio) of the actual energy usage (e.g., the unfiltered energy usage data) to the signal (e.g., the output of the Butterworth filter). The analytics engine 320 may then normalize the ratios based on magnitude to enable a more direct comparison with average signal to noise ratios of other, similar buildings for which data is available. For example, if the signal-to-noise ratio corresponding to the heating season is significantly small (e.g., below average), then the heating system of the HVAC system is identified by the analytics engine 320 as being oversized. For example, if the signal-to-noise ratio corresponding to the cooling season is significantly small (e.g., below average), then the cooling system of the HVAC system is identified by the analytics engine 320 as being oversized. Otherwise, the HVAC system is assumed to be right sized. The HVAC system oversized condition may then be set accordingly.

An oversized HVAC system may be undesirable for a number of reasons. For example, the cooling system of an HVAC system may dehumidify a building as it runs, in addition to cooling the building. However, if the HVAC system is oversized and does not run for a sufficient length of time, then the cooling system may not have sufficient time to effectively dehumidify the building (e.g., as water condensing on the coil of the cooling system will not have had sufficient time to begin dripping into the collection pan of the cooling system, and may instead evaporate back into the air). As another example, running for shorter periods of time due to being oversized generally causes an HVAC system to start-up and shut-down more frequently, and these start-ups and shut-downs tend to contribute more to HVAC system wear-and-tear than steady-state operation. Thus, over-sized HVAC systems may be in need of repair or replacement more quickly than right-sized HVAC systems. As another example, over-sized HVAC systems have traditionally been considered to be less energy efficient than right-sized HVAC systems. Thus, it may be beneficial to present the identification of an over-sized HVAC system or the confirmation that an HVAC system is right-sized to a user (e.g., via inclusion in the building efficiency diagnostics 328 and/or reports that may be generated based on the building efficiency diagnostics 328).

For example, the analytics engine 320 may execute a weekday-weekend-pattern function to detect whether building operation occurs according to a 7-0, 5-2, 6-1 or another applicable weekday-weekend operation pattern (e.g., which may be quantified and stored as one or more weekday-weekend building operation pattern building markers in the building marker database 316). For example, the first number of the pattern identifier may represent the number of days of operation of a first type, such as active operation, and the second number of the pattern identifier may represent the number of operation of a second type, such as inactive operation. For example, the analytics engine 320 may first remove holidays from the input data. The analytics engine 320 may then split the input data into seven subsets, one for each day of the week. The analytics engine 320 may then find the minimum length from among the seven subsets, and may then set the length of each of the seven subsets to this minimum length to ensure that the lengths of all subsets are now equal. The analytics engine 320 may then perform a hierarchical cluster analysis for the seven subsets to produce a cluster dendrogram. The analytics engine 320 may set the number of clusters to 2 (e.g., requiring the algorithm to classify two distinctly different weekly usage patterns) to enable the identification of either a 7-0 (e.g., corresponding to weekend operation being of the same type as weekday operation), 5-2 (e.g., corresponding to weekday operation being of a different type than weekend operation) or 6-1 (e.g., corresponding to Monday through Saturday or Sunday through Friday operation being different from Sunday operation or Saturday operation, respectively) pattern of weekday vs. weekend operation of the audited building by comparing the maximum height of the cluster dendrogram to the minimum height of the cluster dendrogram. If the ratio between the maximum and minimum heights is less than or equal to 1.5, this corresponds to the 7-0 pattern. If this ratio is greater than 1.5, this corresponds to the 5-2 or the 6-1 pattern.

For example, the analytics engine 320 may execute a weekday_pattern function to detect whether building operation occurs according to a 5-0, 4-1, or 3-2 weekday operation pattern (e.g., which may be quantified and stored as one or more weekday building operation building markers in the building marker database 316). For example, the first number of the pattern identifier may represent the number of days of operation of a first type, such as active operation, and the second number of the pattern identifier may represent the number of operation of a second type, such as inactive operation, or vice versa. The analytics engine 320 may then perform a hierarchical cluster analysis for the seven subsets to produce a cluster dendrogram. The analytics engine 320 may then set the number of clusters to 2 (e.g., requiring the algorithm to classify two distinctly different weekly usage patterns) to enable the identification of one of the 5-0, 4-1, or 3-2 weekday operation patterns by comparing the maximum height of the cluster dendrogram to the minimum height of the cluster dendrogram.

For example, the analytics engine 320 may execute a baseload function to find the baseload energy usage of the audited building (e.g., which may be quantified and stored as one or more baseload building markers in the building marker database 316). For example, the analytics engine 320 may apply a Butterworth filter (or another applicable filter) to the energy usage data to filter out any high frequency values (e.g., which may be present due to transient power drops). The analytics engine 320 may then identify daily minimum energy usage values for the energy usage data. The analytics engine 320 may then sort the daily minimum energy usage values from lowest to highest to produce sorted daily minimum energy usage values. The analytics engine 320 may then remove anomalous data points and non-positive values from the sorted daily minimum energy usage values (e.g., using an outlier detection function) to produce cleaned, sorted daily minimum energy usage values. The analytics engine 320 may then determine an average of a number (e.g., 10) of the lowest values of the cleaned, sorted daily minimum energy usage values to produce the baseload energy usage value for the audited building.

For example, the analytics engine 320 may execute a sizing function to determine the size (e.g., measured in a kWh range) of the heating/cooling systems (e.g., the HVAC system and/or other large equipment/similar systems) of the audited building (e.g., which may be quantified and stored as one or more HVAC system size building markers in the building marker database 316). For example, the analytics engine 320 may execute the Systemfinder function to identify the turn on times of the heating/cooling systems, and may filter/subset the energy usage data to include only data points associated with these events turn on events. The analytics engine 320 may then calculate the average and standard deviation of the energy demand (e.g., change in energy usage) values corresponding to each turn on event. The analytics engine 320 may then determine the frequency at which a single magnitude of energy demand is measured at each event time. For example, a 15 kWh energy demand value occurring at 6:45 AM may be identified for 113 days over the course of a year from the energy usage data. This may be statistically significant (e.g., with the number of identified occurrences of the signal magnitude of energy demand being greater than a predetermined threshold), sufficient for the analytics engine 320 to identify that a piece of equipment (e.g., a heating/cooling system) having a 15 kWh energy demand is included in the audited building.

For example, the analytics engine 320 may execute a EUI function to determine the electricity-based energy use intensity (EUI) for the building (e.g., which may be quantified and stored as one or more EUI building markers in the building marker database 316). The analytics engine 320 may determine the energy used (e.g., in kW) per square foot of building footprint per year based on the energy usage data and the predefined building characteristics data. In some embodiments, the EUI may be calculated only for buildings that meet one or more predefined criteria (e.g., such as criteria requiring the building to have an electric-only HVAC system). The EUI for the audited building may be compared to national averages for buildings similar to the audited building (e.g., having the same climate zone and building type as the audited building) to produce a ratio or a percentage that may be included in the building efficiency diagnostics 328 and displayed as part of an audit report shown at the UI 332 of the client device 330. In some embodiments, the EUI for the audited building may also be compared the EUI values or an average of EUI values of similar buildings to the audited buildings for which EUI values have been determined by the system 300.

For example, the analytics engine 320 may execute an abnormal function that detects the abnormal energy consumption business days for the audited building to detect "unusual" circumstances (e.g., which may be quantified and stored as one or more abnormal energy usage days building markers in the building marker database 316). The analytics engine 320 may subset the energy usage data to enable comparison of energy usage data at the same time of day to produce modified energy usage data. The analytics engine 320 may apply a hierarchical clustering technique to the modified energy usage data to produce cluster data. The analytics engine 320 may identify abnormal (i.e., outlier) energy usage days based on the cluster data.

For example, the analytics engine 320 may execute a variability function to determine which timestamps (e.g., data points) of the energy usage data exhibit large variability in energy fluctuations (e.g., which may be quantified and stored as one or more electricity usage variability building markers in the building marker database 316). The analytics engine 320 may create summer and winter boxplots for each hour of each day based on the energy usage data. The analytics engine 320 may then generate contiguous box plots to show the distribution of energy consumption for each hour. The analytics engine 320 may then create a smooth mean of energy usage values for each hour based on which energy usage variability may be identified.

For example, the analytics engine 320 may execute a R-value function to determine the effective R-value (e.g., thermal insulation/infiltration quality) of the audited building (e.g., which may be quantified and stored as one or more an effective R-value building markers in the building marker database 316). The analytics engine 320 may perform disaggregation (e.g., by executing the disaggregation function) on the input data to identify Qload–QHVAC (see EQs 1 and 2, below). The analytics engine 320 may perform self-similarity clustering analysis to find "steady-state" time periods based on the input data (e.g., corresponding to time periods during which little to no change is observed in the interior temperature of the building and/or the exterior temperature around the building), and may select one of the steady-state time periods to be used in the determination of the effective R-value. The analytics engine 320 may then apply an energy equation to solve for Qexterior (see EQs 1 and 2, below). The analytics engine 320 may assume Tinterior (e.g., interior temperature of the audited building) within a predetermined range. The analytics engine may determine Texterior (e.g., ambient/outside temperature around the audited building) based on the weather data. The analytics engine 320 may then calculate the effective R-value of the building envelope based on Qload, QHVAC, Tinterior, and Texterior.

In some embodiments, the effective R-value may be divided into a window R-value and a wall/roof R-value. For example, the analytics engine 320 may, based on one or more digital images of the building (e.g., which may be stored in the predefined building characteristic database 312), identify windows of the building, calculate a first percentage of the exterior surface of the building that is covered in windows, calculate a second percentage of the exterior surface of the building corresponding to walls/roof (i.e., not windows), calculate a windows R-value based on the first percentage, and calculate a roof/walls R-value based on the second percentage.

For example, the analytics engine 320 may execute a disaggregation function to disaggregate the total energy usage into HVAC energy usage and plug load/lighting energy usage subsets.

The energy conservation prognostics 326 may include energy savings recommendations that are identified by the analytics engine 320 based on the variables and building markers extracted from the energy usage data and/or weather data via the execution of the previously described pre-processing functions and building marker functions. For example, if the HVAC system is identified as being oversized, the energy savings recommendations may include a recommendation for replacing the HVAC system with a right sized HVAC system, and may provide an estimate of the energy savings that could be achieved by making these changes. As another example, once the heating/cooling systems' turn on and turn off times are identified, the analytics engine 320 may identify whether energy could be saved by shifting the turn on and/or turn off times. If so, a recommendation to shift the heating/cooling systems' turn on time and/or turn off time may be included in the energy savings recommendations of the energy conservation prognostics 326. Other energy conservation prognostics may include, heating/cooling system efficiency, baseload savings opportunities, exterior light schedule (on/off times), exterior light size, refrigeration size, HVAC size, HVAC setpoint efficiency, thermal resistance effectiveness, building envelope, plug load savings opportunities, HVAC operation efficiency, refrigeration savings opportunities, lighting savings opportunities, insulation savings opportunities, window savings opportunities, and daylight savings time match.

The building efficiency diagnostics 328 may include a number of building and equipment characteristics identified by the analytics engine 320 via the execution of one or more of the functions mentioned above. For example, the building efficiency diagnostics 328 may include the heating/cooling system(s) size, the heating/cooling system(s) schedule(s) (e.g., turn on/turn off times), plug loads, exterior lights size and/or schedule, wall/roof R-value, window R-value, occupancy, baseload, water heating load, refrigerator load, abnormal behavior identification, and/or lighting load, as estimated by the analytics engine 320.

The client device 330 may receive the energy conservation prognostics 326 and the building efficiency diagnostics 328 from the analytics server 314 via the communication network(s) 306. The client device 330 may store in local memory and/or may display via the display/UI 332 the energy conservation prognostics 326 and the building efficiency diagnostics 328. In some embodiments, the energy conservation prognostics 326 and the building efficiency diagnostics 328 may be used to generate an energy audit of the audited building and/or a report of predicted energy usage of the building over a given time period. For example, an energy audit (e.g., corresponding to the building efficiency diagnostics 328) and/or a report of predicted energy usage of the audited building (e.g., corresponding to the energy conservation prognostics 326) may be generated and displayed to a user via the display/UI 332 of the client device 330.

Figure 4:
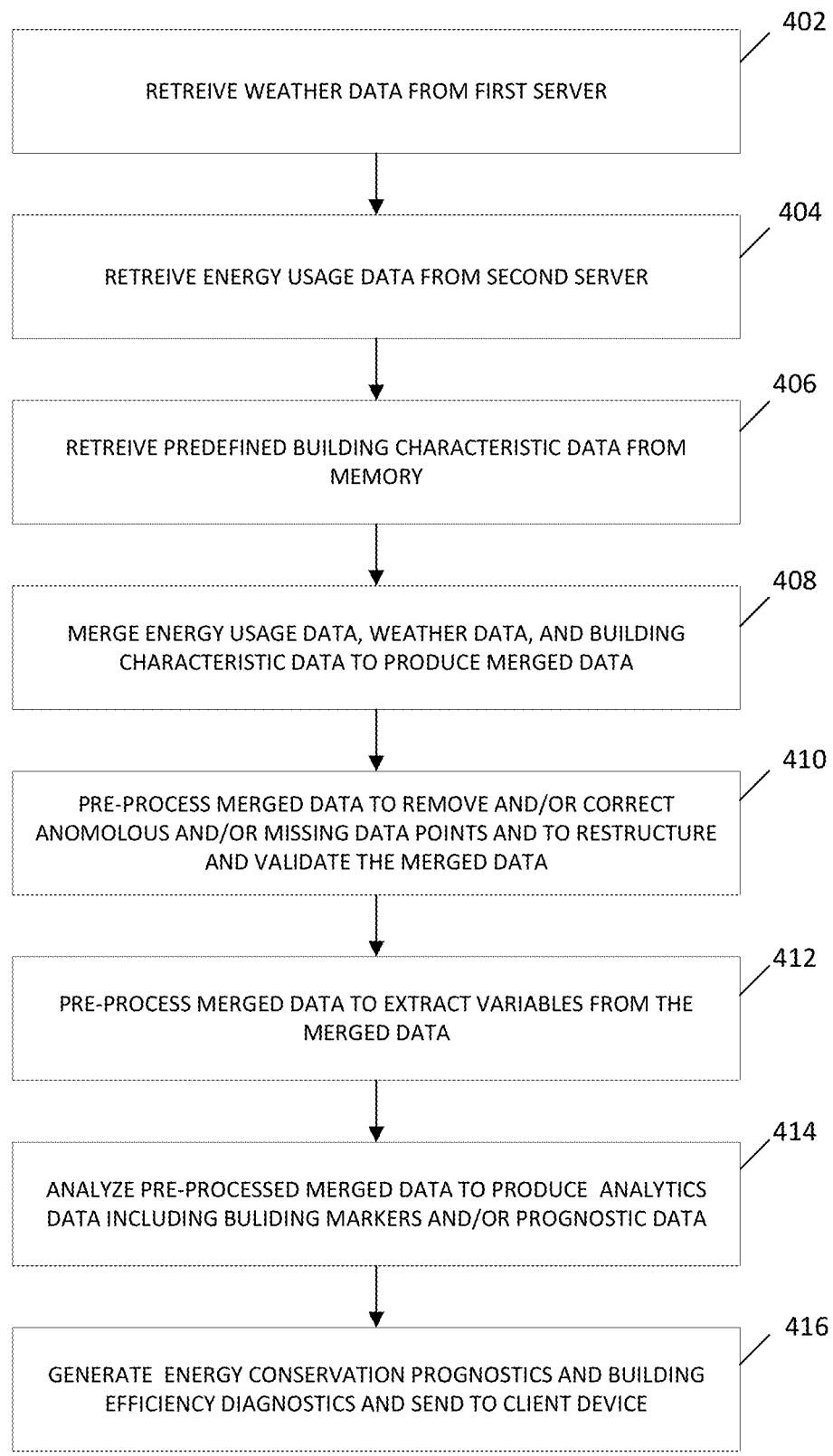
FIG. 4 is an illustrative process flow of a method by which an analytics server may retrieve and processes weather data and energy usage data corresponding to a building to produce energy conservation prognostics and building efficiency diagnostics for that building, in accordance with example embodiments.

FIG. 4 shows an illustrative method by which a server (e.g., analytics server 314 of FIG. 3) may generate energy conservation prognostics and building efficiency diagnostics for a given building based on energy usage data, weather data, and predefined building characteristics data corresponding to the building. For example, the method may be performed by executing computer readable instructions (e.g., at least a portion of which may include functions from which one or more building markers may be derived, sometimes referred to as building marker functions) stored in a memory device (e.g., the memory 104 of FIG. 1; the data storage 204 of FIG. 2) with at least one processor (e.g., the analytics engine 320 of FIG. 3; the processor 102 of FIG. 1) of the server that is coupled to the memory device.

At step 402, the processor retrieves weather data from a first server. The first server may be a weather server (e.g., weather server 302 of FIG. 3) that is coupled to the processor via an electronic communications network (e.g., communication network(s) 306 of FIG. 3). The weather data may be stored on a weather database (e.g., weather database 308 of FIG. 3) of the first server. The weather data may correspond to a local region in which the building is located. For example, the weather data may include time-series datastreams for each of a number of weather variables (e.g., which may include outdoor/ambient temperature, wind speed, relative humidity, solar irradiance, global horizontal irradiance, precipitation, dew point, and/or other applicable weather variables) for a geographic region associated with the building.

At step 404, the processor retrieves energy usage data from a second server. The second server may be a utilities server (e.g., utilities server 304 of FIG. 3) that is coupled to the processor via an electronic communications network (e.g., communication network(s) 306 of FIG. 3). The energy usage data may be retrieved from an energy usage database (e.g., energy usage database 310 of FIG. 3) of the second server. For example, the energy usage data may include one or more time-series datastreams corresponding to energy usage (e.g., electricity usage measured in kilowatt hours (kWh)) of the building over time.

At step 406, the processor retrieves predefined building characteristic data from a memory device coupled to the processor, which may be a local or external memory device. For example, the processor may retrieve the predefined building characteristic data from a predefined building characteristic database (e.g., predefined building characteristic database 312), which may be stored in the memory device. The database may be populated with predefined building characteristic data having been previously defined via user input provided at a client device communicatively coupled to the processor and/or the memory device (e.g., via the electronic communication network). For example, a user may be prompted at a display/UI (e.g., the display/UI 332 of FIG. 3) of the client device to input a number of building characteristics related to the building, which may include but are not limited to square footage of the audited building, the number of floors of the building, the geographic region of the building, the building type (e.g., office, lab, warehouse, residence, retail store, etc.), and the aspect ratio of the building (e.g., thin spire, flat pancake, etc.). Alternatively, this information may be obtained or verified from public sources, such as real estate transaction records (e.g., home sales reported via public databases may provide square footage or number of stories, or Google Street View images may be processed with computer vision applications to provide data concerning building shape (2-story versus 1-story, percentage of building walls comprising windows)

At step 408, the processor merges the energy usage data, the building characteristic data, the energy usage data, and the weather data to produce merged data.

At step 410, the processor pre-processes the merged data to remove and/or correct anomalous and/or missing data points, and to restructure and validate the merged data. For example, the processor may execute any or all of the fullday_tagging, f_missing_data, anom_fix, Imputation, *_reader, cleaning_criteria, and core_meta functions described above in performing these tasks.

At step 412, the processor pre-processes the merged data to extract variables from the merged data including weather statistics. For example, the extracted variables may obtained via execution by the processor of any or all of the dataframe, and seven_day_statistics functions described above.

At step 414, the processor analyzes the pre-processed, merged data via processing of the data with a number of building marker functions to produce analytics data, which may include multiple building markers and/or prognostic data. For example, the building markers may include a heating/cooling system turn on time building marker, a heating/cooling system turn off time building marker, a heating/cooling system turn on wattage building marker, a diurnal pattern building marker, a rescheduling savings opportunity building marker, an energy usage change building marker, a heating type building marker, a cooling type building marker, a heating/cooling system size building marker, a HVAC system oversized condition building marker, one or more building operation patterns building markers, a baseload building marker, a building energy usage intensity building marker, an abnormal energy usage days building marker, an energy usage variability building marker, and/or an effective R-value building marker. For example, the prognostics data may include one or more predictions of energy usage over one or more defined, future time periods, and may be generated based on forecast weather data of the retrieved weather data. For example, the prognostics data may be generated using an artificial intelligence predictive model, which may be a random forest model, a neural network model, and/or a support-vector machine (SVM) model, for example. The building markers of the analytics data may be stored in a building marker database (e.g., building marker database 316 of FIG. 3), for example. The analytics data may be generated based on some or all of the extracted variables. For example, the analysis may be performed via execution by the processor of any or all of the on_off_tagging, system_finder, system_finder_2, thermal_mass, thermal_mass_steam, prediction_svm, prediction_rf, Systemfinder, Ext_light_finder, Chisquare_periodogram, Forecast, Forecast-ml, reschedule, ChangeBehavior, HVAC_type, noise_filter, weekday-weekend-pattern, weekday_pattern, baseload, sizing, EUI, abnormal, variability, R-value, and disaggregation functions described above, with the analytics data including the outputs of the executed functions.

At step 416, the processor generates energy conservation prognostics and building efficiency diagnostics based on the analytics data, and sends the energy conservation prognostics and the building efficiency diagnostics to a client device (e.g., via the electronic communications network). The client device may then display these prognostics and diagnostics via a display/UI.

Building Marker and Predictive Calculations

A discussion now follows describing how certain building markers (e.g., the building markers of the building marker database 316 of FIG. 3) are derived from datasets to arrive at a robust system for auditing building energy and, ultimately, providing recommendations for building improvements to reduce energy usage (e.g., to improve energy efficiency of the building) and predictions of results of making such changes.

As noted above, certain categories of data may be input into a database of multiple buildings, which may be used in initial determination of useful building markers. For example, it may be desirable to obtain building attribute data such as the building's location (e.g., buildings in Texas may consume more energy in summer than buildings in and Alaska); whether it is a residential or commercial building; the square footage of the building; the number of floors of the building; the year the building was constructed; the building footprint (e.g., from Google Earth or satellite views); the hours of operation of a business housed in the building; etc. Attributes such as the building square footage and number of floors are important to understanding the thermal management characteristics of a building, but also enable cross-sectional studies, e.g. comparing multiple similar buildings in a given location, or across climatic zones. For each building, it is also desirable to obtain relevant weather and solar insolation data, such as weather data available from sources such as the U.S. National Weather Service, the National Oceanic and Atmospheric Administration (NOAA), dOE-NREL Solar Resource and satellite-based weather providers such as SolarGIS. This data would be obtained for each locale of each building input into the database. In addition, building energy meter datasets (which may be obtained directly from the buildings themselves or provided via the respective utilities) and associated metadata, is ingested, assessed, cleaned, and organized. In one embodiment, it may be useful for electricity meter data in kWh to be captured in 15-minute intervals while natural gas data may be monthly.

These datasets (building characteristics, weather data, and energy usage data) for a given building are combined, and initial data analytics are run to assess data integrity and suitability, as well as to categorize and tag data accordingly. Low quality datasets may be discarded.

Based on these datasets, it has been determined by the inventors that the certain markers may be determined from large multi-building datasets, and used to provide helpful and accurate prognostics for building owners to reduce energy consumption. For example, HVAC load, plug load, lighting load and schedule, building R-value and thermal mass, daily occupancy, and others can be assessed from the compiled datasets using techniques described herein. These markers can then be used to provide energy reduction recommendations as further described below. Additional building markers include:

TABLE 1

Building marker descriptions

| | Diagnostics: |
|---|---|
| 1. | HVAC load |
| 2. | HVAC schedule |
| 3. | Wall/roof R-value |
| 4. | Window R-value |
| 5. | Occupancy |
| 6. | Baseload |
| 7. | Lighting load |
| 8. | Water heating load |
| 9. | Plug load |
| 10. | Refrigerator load |
| | Fault detection: |
| 12. | HVAC fault detection |
| | Prognostics: |
| 13. | Thermostat setback savings |
| 14. | Baseload savings |
| 15. | HVAC schedule savings |
| 16. | R-value window savings |
| 17. | R-value insulation savings |
| 18. | Plug load savings |
| 19. | Lighting savings |
| | Diagnostic continuous commissioning: |
| 20. | Abnormal behavior identification |

Turning to a first example, HVAC load and HVAC schedule may be determined from building meter data for a given building, set of buildings, or entire database of buildings. In one embodiment, these markers may be derived from monitoring the standard deviations of the electricity variations in time to reveal specific "turn on" and "turn off" times of HVAC equipment such as fans or other, similar equipment such as refrigeration units and water heaters. Even more by isolating and comparing/contrasting portions of the data during which time the HVAC equipment is on or off in association with an understanding of when exterior conditions (i.e. temperature and solar insolation) are changing or steady, we can disaggregate the HVAC load from the total load. Importantly, the systems disclosed herein can assess HVAC cycles without requiring thermostat scheduling data. However, in alternative embodiments, "smart" thermostats may push HVAC scheduling data to the system to be used in addition to or in place of (or as a validation of) the derived HVAC scheduling data.

Figure 5:
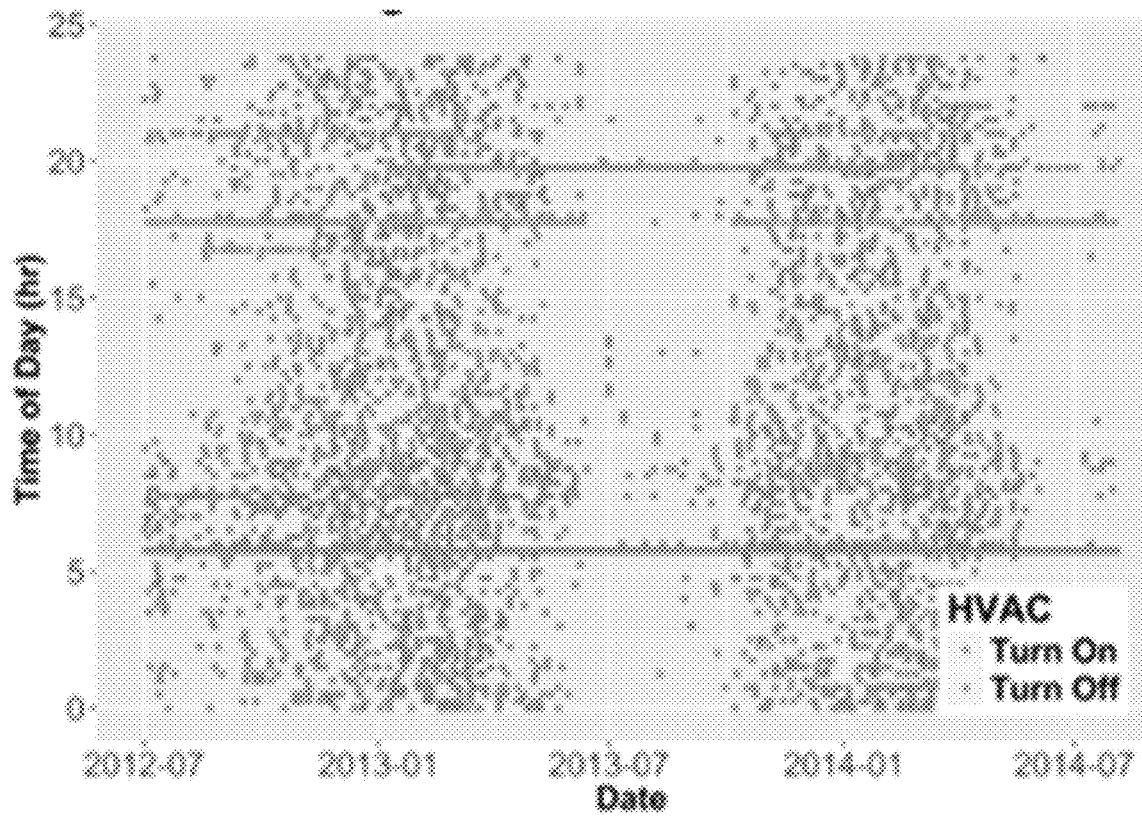
FIG. 5 is a graph illustrating how HVAC system on/off times are determined from time series energy data.

FIG. 5 illustrates a statistical analysis of time series energy data (shown as plotted data points), in which HVAC turn on and turn off times are determined over a series of dates to assess HVAC scheduling. This statistical analysis could be performed over all of the time series data, by week (e.g., seasons of the year), by day of week, or by day of week over certain seasons (as based on weather data).

As another example, effective building R-value can be determined by application of an energy balance on the building during select times of year combined with a statistical analysis. To provide more insight to this approach, the analysis can be thought of as:

$$\dot{Q}_{exterior} + \dot{Q}_{load} - \dot{Q}_{HVAC} = \left[mC\frac{dT}{dt}\right]_{shell} + \left[mC\frac{dT}{dt}\right]_{air} + \varepsilon \quad (1)$$

where Qexterior is the heat being conducted, convected and radiated from the exterior to the interior space since the exterior is hotter than the interior (i.e. in summer months);

Qload is the interior heating load due to the presence of equipment; QHVAC is the energy being removed from the air-conditioned space; mC is the thermal mass, which is mass multiplied by specific heat; and dT/dt refers to the change in temperature with time. Of course the transient thermal behavior (right hand side of the equation) must be split into two systems: that of the building shell and that of the interior air given their markedly different behavior. The error term, ε, is included to capture the statistical variation of the data. Additionally a Fourier Law approach reveals:

$$\dot{Q}_{exterior} = \frac{T_{interior} - T_{exterior}}{R_{total}} \quad (2)$$

where $T_{interior}$ and $T_{exterior}$ are the interior and exterior temperatures inside and outside the building, respectively; and $R_{total}$ is the total series thermal resistance, accounting for exterior convection and radiation ($R_{exterior}$), plus interior convection (Anterior), and plus thermal conduction/infiltration through the building shell ($R_{building}$). $R_{exterior}$ and $R_{interior}$ are determined using a simple resistance analysis such that R=1/hA, where h is the heat transfer coefficient and A is the relevant surface area of the building. vTo isolate $R_{total}$, times during the year may be found when the building exhibits a steady interior temperature during the portion of the day being analyzed, then the right hand side of the energy balance equation is effectively zero. Using techniques described above to isolate $Q_{HVAC}$ and $Q_{load}$ from select data subsets along with the Fourier Law equation $R_{total}$ can be solved. Subsequently, $R_{building}$ or the effective "R-value" of the building can then be determined by assuming commonly accepted values for the heat transfer coefficients. For example, the inventors have found in one example that to determine the R-value of a university campus building, a 95% confidence could be achieved if the energy data conformed to specific weather and temporal conditions.

With additional metadata for, or an estimate of, window-to-wall ratio in the building, a parallel thermal resistance network analysis can be employed to determine the corresponding effective R-value of the windows in the building. Consequently, this analysis ultimately reveals the potential value of, and opportunity for, window replacement which is a common energy conservation measure (ECM) recommendation. For example, this analysis was applied to one real world buildings, and the resulting findings were then validated against an energy audit conducted by an on-site energy audit firm, to reveal that as-calculated low R-value buildings correspond well to those buildings which the company determined are in need of retro-commissioning or deep retrofit to achieve energy efficiency goals set by the building owner. The firm's on-site energy audit required engineers to access the building in-person, over several days per building and at a cost of thousands of dollars per building. The systems and methods disclosed herein are capable of diagnosing similar problems with the building within minutes and at a much reduced cost.

While the above examples have been provided in the context of analyzing a single building, it should be understood that multiple buildings may be similarly analyzed, with energy conservation prognostics and building efficiency diagnostics and corresponding reports being generated, stored, and/or displayed for each. As an example, a system for providing virtual energy audits (e.g., the system 300 of FIG. 3) may receive a list of target buildings from a client device, along with predefined building characteristics for each of the target buildings. The system may generate energy conservation prognostics and building efficiency diagnostics for each of the target buildings based on corresponding weather data and energy usage data in combination with the predefined building characteristics for each building. The system may then rank the target buildings according to one or more predefined factors. For example, the system may rank the target buildings according to how much money and/or energy could be saved by implementing recommended operational adjustments and/or retrofits (e.g., ECM recommendations) based on the energy conservation prognostics. A predefined number of target buildings for which the most money/energy is estimated to be saved if such recommendations are implemented may then be sent to the client device. In this way, an individual or corporation owning many buildings may quickly and cheaply identify which of their buildings should be adjusted or retrofitted with the highest priority, compared to conventional auditing methods, which may require time consuming and expensive individual walkthroughs of each of the buildings being audited.

Exemplary Systems

The foregoing features, functions, and attributes relating to virtual building energy audits can be implemented via multiple different types of equipment and network configurations to provide various levels of service and recommendations to different users.

For example, in one embodiment, the virtual building energy audit may be provided by a company that operates the analytics server. That company might provide services directly to owners of buildings (e.g., a franchise owner, a residential homeowner, or an owner of an apartment or complex of buildings, or an owner of multiple buildings in multiple geographies). The company would first obtain consent from its customer to allow the company to obtain energy usage data directly from the utility provider(s) (gas, electric, or other) for the customer's requested target buildings. The customer would also provide the address or other geography information for the target buildings. In one implementation, the company could obtain additional building-specific characteristic data from publicly available sources (e.g., obtaining square footage information from real estate records, obtaining building height/number of stories from public building permit records or similar records, obtaining building height/number of stores from images of the building (e.g., using computer vision algorithms to assess street view images)) or could request such data from the customer. The company would combine the energy usage data and the building-specific characteristic data with weather data (which could be obtained from public sources) into an energy audit dataset. In alternate embodiments, the company could also combine additional data from "smart" devices within the home. E.g., a smart thermostat could push scheduling data to the company; a smart bulb could push on/off data to the company; audio sensors could detect on/off times of water heaters and HVAC systems (including their blowers); hot water heaters could push temperature settings; or the like. Some smart thermostats and other devices also automatically determine an "at home" or "away" status of a building, which could also be pushed to the company's network. The data from these "smart" devices could be used for validation and tuning of the determinations made by an analytic service from utility energy data, or could be used in combination with such data to assess the building markers discussed above.

Based on this dataset, the various functions described above could be assessed, and a determination could be made regarding the building markers associated with the target building. Minimally, each of the foregoing building marker functions can be assessed without any additional data beyond that which can be obtained "off site". In other words, no entry into the buildings would be necessary, and only a limited amount of information would need to be requested of customers.

Diagnostics could be calculated (e.g., base load, HVAC load, total HVAC run time, total heating time, total cooling time, total water heater operation time, total energy consumption, etc.) for a building, and the building's energy audit dataset could be stored in a main database for several uses: for improving the datasets on which the aforementioned functions operate and for sake of providing future relevant comparisons to other users.

The company could then provide to the customer a set of recommendations for energy conservation measures to be taken for the buildings, along with a comparison of the buildings' energy efficiency to the efficiency of similar subsets of buildings. In one implementation, the energy conservation measures may be presented to a user in coordination with vendors and providers who offer appropriate goods and services for making the recommended changes. For example, a recommendation to install a more efficient water heater may include a recommended water heater, a price for the water heater, a business offering that water heater, and a trusted plumbing vendor to install the water heater. As another example, a recommendation may include specific instructions for setting HVAC on/off cycles, or an automatic "over the air" update of smart thermostat settings. In alternate embodiments, the company may permit one or more vendors and suppliers to provide for the customer quotations for performing the recommended services. In further alternate embodiments, the system could assess whether HVAC cycles are occurring appropriately given day-of weather data, so as to assess whether homes are potentially not being heated or cooled enough on extreme temperature dates. In some instances, appropriate authorities could be contacted if an at-risk, occupied home is not exhibiting HVAC load or HVAC cycles for sufficient cooling or heating during extreme temperature days, as a means of potentially preventing hypo or hyper thermia.

In another implementation, the virtual energy audit may be performed directly by a utility company. For example, an electric utility may allow its customers to opt in to the service, and provide its customers with energy conservation measures, recommendations, quotations, etc.

In another implementation, a sensor may be installed at a building to bypass the need to obtain utility energy data from a utility. Rather, the audits could be performed entirely within a device purchased and installed by a user, which connects to a remote analytics service via a Wi-Fi or other suitable connection. For example, a sensor could be attached to an electric meter or at a breaker box to measure wattage for a home, or by circuit within a home (e.g., the circuit for a furnace, the circuit for a water heater, or room by room circuits).

A user interface could also be provided, which allows a user to run diagnostics on demand. The user could input additional information via, e.g., a web portal or mobile app, such as indicating the user has made a recommended energy conservation measure (e.g., installed new windows or installed a new A/C unit), or indicating further characteristic information of the building to fine tune diagnostics, or indicating date ranges when the building will be unoccupied.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

The invention claimed is:

1. A system for providing virtual energy audits comprising:
   at least one database memory comprising:
      a building characteristic database having a record structure that stores a predefined set of building characteristic data corresponding to a target building;
      a time-series energy usage database having a record structure that stores time-series energy usage data for the target building; and
      a building marker database having stored thereon building markers associated with building characteristics;
   an audit tools memory comprising:
      a predictive model database having stored thereon least one predictive model; and
      a building marker function database having stored thereon a set of instructions that implement functions for ascertaining the building markers;
   a processor of at least one analytics server of the system, the processor in communication with the database memory and the audit tools memory and configured to execute computer-readable instructions stored in the audit tools memory which, when executed by the processor, cause the processor to:
      retrieve weather data corresponding to the target building from a weather server coupled to the at least one analytics server;
      retrieve energy usage data corresponding to the target building from a utility server coupled to the at least one analytics server;
      retrieve the predefined set of building characteristic data from the building characteristic database;
      apply a data frame function to the weather data and the energy usage data to generate a set of variables that include local weather statistics and energy usage statistics corresponding to the target building;
      identify a plurality of building markers for the target building based on input data comprising the weather data, the energy usage data, the building characteristic data, and the set of variables;
      pre-process the input data to generate pre-processed input data by:
         generating a first set of tags defining days for which full data of the weather data and the energy usage data is available;
         identifying and replacing missing values of the input data;
         detecting and replacing anomalous data points by:
            performing time-series decomposition of the input data to produce a decomposed time series;
            identifying outliers of the decomposed time series; and
            removing and replacing the identified outliers; and
         imputing missing data points from the input data by:
            applying linear imputation to sets of four or fewer consecutive missing data points; and applying a diffusion index analysis based forecasting method to sets of five or greater consecutive missing data points;
store the plurality of building markers in the building marker database;
generate building efficiency diagnostics based on the plurality of building markers, wherein the building efficiency diagnostics include estimated heating/cooling system characteristics of the target building;
send the building efficiency diagnostics to be displayed on a user interface of a client device coupled to the at least one analytics server;
periodically monitor the building efficiency diagnostics to automatically identify one or more conditions which indicate an energy inefficiency for the target building, according to a predetermined interval; and
upon identifying the one or more conditions, automatically provide, via the user interface, a recommendation for an energy conservation measure to be taken for the target building.

2. The system of claim 1, wherein the plurality of building markers include one or more of: a heating/cooling system turn on time building marker, a heating/cooling system turn off time building marker, a heating/cooling system turn on wattage building marker, a diurnal pattern building marker, a rescheduling savings opportunity building marker, an energy usage change building marker, a heating type building marker, a cooling type building marker, a heating/cooling system size building marker, a heating/cooling system oversized condition building marker, one or more building operation patterns building markers, a baseload building marker, a building energy usage intensity building marker, an abnormal energy usage days building marker, an energy usage variability building marker, and/or an effective R-value building marker, wherein the estimated heating/cooling system characteristics are derived, by the processor, from the heating/cooling system turn on time building marker, the heating/cooling system turn off time building marker, the heating/cooling system oversized condition building marker, and the heating/cooling system size building marker.

3. The system of claim 2, wherein the computer-readable instructions, when executed by the processor, further cause the processor to:
generate the heating/cooling system turn on time building marker, the heating/cooling system turn off time building marker, and the heating/cooling system turn on wattage building marker by:
calculating a derivative of the energy usage data to produce a derivative dataset defining changes in energy usage between timestamps of the energy usage data;
identifying heating/cooling system turn on times from the derivative dataset;
identifying heating/cooling system turn off times from the derivative dataset;
identifying a first mode of the identified heating/cooling system turn on times;
identifying a second mode of the identified heating/cooling system turn off times;
setting the heating/cooling system turn on wattage building marker based on observed energy usage changes occurring at the heating/cooling system turn on times;
setting the heating/cooling system turn on time building marker equal to the first mode; and
setting the heating/cooling system turn off times equal to the second mode.

4. The system of claim 2, wherein the computer-readable instructions, when executed by the processor, further cause the processor to:
generate the diurnal pattern building marker by:
applying a chi-squared periodogram test to the energy usage data to identify the diurnal pattern.

5. The system of claim 2, wherein the computer-readable instructions, when executed by the processor, further cause the processor to:
generate the rescheduling savings opportunity building marker by:
applying an analytical method to the energy usage data to identify when the target building is unoccupied, wherein the analytical method is selected from the group consisting of: wavelet transform, two sample t-test, and paired t-test;
determining that the heating/cooling system is active when the target building is unoccupied based on the energy usage data;
generating a recommendation to adjust a temperature setpoint of the heating/cooling system of the target building; and
generating an estimated cost savings associated with adjusting the temperature setpoint according to the recommendation.

6. The system of claim 2, wherein the computer-readable instructions, when executed by the processor, further cause the processor to:
generate the energy usage change building marker by:
separating the energy usage data into a plurality of single-year subsets;
for each year represented in the plurality of single-year subsets, identifying significant change-points of the energy usage data that occurred during that year;
determining that a correlation between first and second significant change points of the significant change points is lower than a predetermined threshold; and
flagging the first and second significant change points as corresponding to a retrofit time for the target building.

7. The system of claim 2, wherein the computer-readable instructions, when executed by the processor, further cause the processor to:
generate the heating type building marker and the cooling type building marker by:
removing datapoints from the energy usage data and the weather data corresponding to holidays and weekends to produce modified energy usage data and modified weather data;
applying a piecewise linear regression model to the modified energy usage data and time-series exterior temperature data of the modified weather data to produce a heating season trendline and a cooling season trendline;
determining a first slope of the heating season trendline;
determining a second slope of the cooling season trendline;
comparing the first slope to a first predetermined threshold to determine the heating type of the target building;
comparing the second slope to a second predetermined threshold to determine the cooling type of the target building;
setting the heating type building marker equal to the determined heating type; and setting the cooling type building marker equal to the determined cooling type.

8. The system of claim 2, wherein the computer-readable instructions, when executed by the processor, further cause the processor to:
generate the heating/cooling system size building marker by:
generating the heating/cooling system turn on time building marker;
defining a subset of the energy usage data as a set of datapoints corresponding to the heating/cooling system turn on time building marker;
determining energy demand values for each of the set of datapoints;
determining a mode of the energy demand values; and
setting the heating/cooling system size building marker equal to the mode.

9. The system of claim 2, wherein the computer-readable instructions, when executed by the processor, further cause the processor to:
generate the heating/cooling system oversized condition building marker by:
identifying a first subset of the energy usage data corresponding to a heating season;
identifying a second subset of the energy usage data corresponding to a cooling season;
applying a low-pass filter to the first subset to generate a first signal;
applying the low-pass filter to the second subset to generate a second signal;
generating a first signal-to-noise ratio of the first signal to the first subset;
generating a second signal-to-noise ratio of the second signal to the second subset;
determining that the first signal-to-noise ratio is less than a first average signal-to-noise ratio corresponding to similar buildings in the heating season;
determining that the second signal-to-noise ratio is less than a second average signal-to-noise ratio corresponding to the similar buildings in the cooling season; and
setting the heating/cooling system oversized condition building marker to indicate that the heating/cooling system is oversized.

10. The system of claim 2, wherein the computer-readable instructions, when executed by the processor, further cause the processor to:
generate the one or more building operation patterns building markers by:
removing data points corresponding to holidays from the energy usage data to produce filtered energy usage data;
dividing the filtered energy usage data into seven subsets, each corresponding to a different day of week;
determining a minimum length from among the seven subsets;
setting lengths of each of the seven subsets equal to the minimum length;
performing hierarchical cluster analysis on the seven subsets to produce a cluster dendrogram;
determining that a ratio of a maximum height of the cluster dendrogram to a minimum height of the cluster dendrogram is less than or equal to a predetermined threshold; and
setting the building operation patterns building marker to indicate a pattern corresponding to the predetermined threshold.

11. The system of claim 2, wherein the computer-readable instructions, when executed by the processor, further cause the processor to:
generate the baseload building marker by:
applying a low-pass filter to the energy usage data to produce filtered energy usage data;
identifying daily minimum energy usage values from the filtered energy usage data;
sorting the daily minimum energy usage values by magnitude to produce sorted daily minimum energy usage values;
removing any anomalous and/or negative valued data points from the sorted daily minimum energy usage values to produce cleaned, sorted daily minimum energy usage values;
calculating an average of a predetermined number of lowest values of the cleaned, sorted daily minimum energy usage values; and
setting the baseload building marker equal to the average.

12. The system of claim 2, wherein the computer-readable instructions, when executed by the processor, further cause the processor to:
generate the building energy usage intensity building marker by:
setting the energy usage intensity building marker equal to an amount of energy used per square foot per year value based on the energy usage data and the predefined set of building characteristic data; and
comparing the energy usage intensity building marker to an average energy usage intensity building marker corresponding to a set of buildings, wherein a first climate zone of the set of buildings and a second climate zone of the target building are the same, and wherein a first building type of the set of buildings and a second building type of the target building are the same.

13. The system of claim 2, wherein the computer-readable instructions, when executed by the processor, further cause the processor to:
generate the abnormal energy usage days building marker by:
dividing the energy usage data into subsets;
applying hierarchical clustering to the subsets to produce cluster data;
identifying abnormal days corresponding to outlier energy usage based on the cluster data; and
flagging the identified abnormal days.

14. The system of claim 2, wherein the computer-readable instructions, when executed by the processor, further cause the processor to:
generate the energy usage variability building marker by:
generating a summer boxplot from first datapoints of the energy usage data corresponding to a summer time period;
generating a winter boxplot from second datapoints of the energy usage data corresponding to a winter time period;
generating a set of contiguous box plots for each hour represented in the summer boxplot and the winter boxplot; and
calculating a smooth mean of energy usage values for each hour in both summer and winter.

15. The system of claim 2, wherein the computer-readable instructions, when executed by the processor, further cause the processor to:
generate the effective R-value building marker by:
disaggregating the energy usage data into a heating/cooling dataset and a load dataset;
determining an interior heating load for a selected time period based on the load dataset, wherein the selected time period corresponds to a time period during which an interior temperature of the target building is substantially unchanging;
determining an amount of energy being removed from air-conditioned space of the target building based on the heating/cooling dataset for the selected time period;
determining an exterior temperature of the target building for the selected time period based on the weather data;
estimating the interior temperature of the target building for the selected time period within a predetermined range; and
setting the effective R-value building marker corresponding to a thermal insulation quality of the target building based on the amount of energy being removed, the interior heating load, the exterior temperature, and the interior temperature.

16. The system of claim 2, wherein the computer-readable instructions, when executed by the processor, further cause the processor to:
generate prognostics data based on the input data, the prognostics data comprising energy conservation measure recommendations and estimated impacts of implementing the energy conservation measure recommendations;
generate energy conservation prognostics based on the prognostics data and the plurality of building markers; and
send the energy conservation prognostics to be displayed on the user interface of the client device.

17. The system of claim 16, wherein the prognostics data is generated by processing the weather data and the energy usage data using at least one predictive model, wherein the at least one predictive model is selected from the group consisting of: a neural network model, a random forest model, a support-vector machine model, GBRT model, and a diffusion index model.

18. The system of claim 17, wherein the computer-readable instructions, when executed by the processor, further cause the processor to:
generate the energy conservation prognostics by:
generating a recommendation for an energy conservation measure corresponding to an action that could be taken to improve energy efficiency of the building, identified based on at least one of the building markers; and
generating a prediction of an effect the energy conservation measure would have on the energy efficiency of the building; and
send the recommendation and the prediction to be displayed at the user interface of the client device.

19. The system of claim 18, wherein the at least one of the building markers comprises the effective R-value building marker.

20. The system of claim 1, wherein the predetermined interval is 15 minutes.

21. A method for providing virtual energy audits comprising:
retrieving, by a processor of an analytics server, weather data corresponding to at least one target building from a weather server coupled to the analytics server;
receiving, by the processor, utility energy usage data corresponding to the at least one target building;
obtaining a set of building-specific characteristic data corresponding to the at least one target building;
combining the weather data, utility energy usage data, and building-specific characteristic data into an energy audit dataset;
apply a data frame function to the weather data and the energy usage data to generate a set of variables that include local weather statistics and energy usage statistics corresponding to the target building;
determining a plurality of building markers for the at least one target building based on the energy audit dataset and the set of variables;
pre-processing the energy audit dataset to generate a pre-processed energy audit dataset by:
generating a set of tags defining days for which full data of the weather data and the energy usage data is available;
identifying and replacing missing values of the energy audit dataset;
detecting and replacing anomalous data points by:
performing time-series decomposition of the energy audit dataset to produce a decomposed time series;
identifying outliers of the decomposed time series; and
removing and replacing the identified outliers from the energy audit dataset; and
imputing missing data points from the energy audit dataset by:
applying linear imputation to sets of four or fewer consecutive missing data points; and
applying a diffusion index analysis based forecasting method to sets of five or greater consecutive missing data points;
generating prognostics data based on the energy audit dataset and building markers, the prognostics data comprising energy conservation recommendations and estimated impacts of implementing the energy conservation recommendations;
generating building efficiency diagnostics based on the plurality of building markers, wherein the building efficiency diagnostics include estimated heating/cooling system characteristics of the at least one target building;
sending the building efficiency diagnostics and the energy conservation recommendations to be displayed on a user interface of a client device coupled to the analytics server;
periodically monitoring the building efficiency diagnostics to automatically identify one or more conditions which indicate an energy inefficiency for the target building, according to a predetermined interval; and
upon identifying the one or more conditions, automatically providing, via the user interface, a recommendation for an energy conservation measure to be taken for the target building.

22. The method of claim 21, wherein the plurality of building markers include one or more of: a heating/cooling system turn on time building marker, a heating/cooling system turn off time building marker, a heating/cooling system turn on wattage building marker, a diurnal pattern building marker, a rescheduling savings opportunity building marker, an energy usage change building marker, a heating type building marker, a cooling type building marker, a heating/cooling system size building marker, a heating/cooling system oversized condition building marker, one or more building operation patterns building markers, a baseload building marker, a building energy usage intensity building marker, an abnormal energy usage days building marker, an energy usage variability building marker, and/or an effective R-value building marker.

23. The method of claim 21, wherein the at least one target building comprises a plurality of target buildings, wherein the building efficiency diagnostics comprise a plurality of subsets of building efficiency diagnostics, wherein the energy conservation recommendations comprise a plurality of subsets of energy conservation recommendations, wherein each of the plurality of target buildings corresponds to a respectively different subset of building efficiency diagnostics of the plurality of subsets of building efficiency diagnostics, wherein each of the plurality of target buildings corresponds to a respectively different subset of energy conservation recommendations of the plurality of subsets of energy conservation recommendations, the method further comprising the steps of:
    quantifying a respective savings opportunity value for each of the plurality of target buildings to produce a plurality of savings opportunity values, wherein the energy conservation recommendations comprise the plurality of savings opportunity values;
    generating an ordered list of the plurality of target buildings that is ordered based on the plurality of savings opportunity values;
    identifying a subset of target buildings of the plurality of target buildings associated with the highest savings opportunity values of the plurality of savings opportunity values; and
    sending the ordered list and the identified subset of target buildings to be displayed via the user interface of the client device.

24. The method of claim 21, wherein each of the weather data and the set of building-specific characteristic data are generated off-site from the at least one target building, and wherein the energy usage data is generated only by at least one meter of the at least one target building.

25. The method of claim 24, wherein the building-specific characteristic data is limited to one or more of: building square footage; number of stories of the at least one target building; geographic location of the at least one target building; and/or an aspect ratio of the at least one target building determined from square footage and number of stories of the at least one target building.

26. The method of claim 25, further comprising the step of obtaining a building owner's consent to receive utility data, and obtaining at least one year of utility energy usage data directly from one or more providers of energy services for the at least one target building.

27. The method of claim 21, wherein the predetermined interval is 15 minutes.

28. A system for providing virtual energy audits comprising:
    at least one database memory comprising:
        building characteristic data corresponding to a target building; and
        time-series energy usage data for the target building; and
    a processor in communication with the at least one database memory, and configured to execute computer-readable instructions stored in the at least one database memory which cause the processor to:
        periodically retrieve weather data for a geography corresponding to the target building;
        periodically retrieve new energy usage data corresponding to the target building from at least one of a utility providing energy to the target building or a power sensor disposed at the target building, and add the new energy usage data to the time-series energy usage data in the at least one database memory;
        identify a plurality of building markers for the target building based on input data comprising the weather data, the time series energy usage data, and the building characteristic data;
        automatically generate building efficiency diagnostics based on the plurality of building markers;
        determine whether an oversized condition, a reschedule condition, or an abnormal condition exists for at least one electrical system of the target building, based upon the plurality of building markers and at least one of:
            a seasonal subset of the time series energy usage data;
            turn on and turn off times for the at least one electrical system, derived from the time series electrical usage data; or
            an energy usage change identified from comparing a current subset of the time series energy usage data to a corresponding previous subset of the time series energy usage data; and
        automatically alerting a user of a flag for the determined oversized condition, reschedule condition, or abnormal condition and providing a recommendation to the user for modifying the at least one electrical system to improve energy efficiency of the target building.

29. The system of claim 28, wherein the computer-readable instructions, when executed by the processor, further cause the processor to:
    pre-process the input data to generate pre-processed input data by:
        generating a first set of tags defining days for which full data of the weather data and the energy usage data is available;
        identifying and replacing missing values of the input data;
        detecting and replacing anomalous data points by:
            performing time-series decomposition of the input data to produce a decomposed time series;
            identifying outliers of the decomposed time series; and
            removing and replacing the identified outliers; and
        imputing missing data points from the input data by:
            applying linear imputation to sets of four or fewer consecutive missing data points; and
            applying a diffusion index analysis based a forecasting method to sets of five or greater consecutive missing data points.

30. The system of claim 28, wherein to determine whether the oversized condition exists for the at least one electrical system, the computer-readable instructions, when executed by the processor, further cause the processor to:
    identify the seasonal subset of the energy usage data corresponding to a cooling season;
    apply a third order low-pass filter to the subset to generate a filtered signal;

compare the filtered signal to unfiltered energy usage data corresponding to the subset, to generate ratio data; and based upon the ratio data and the turn on and turn off times for the given cooling season, setting the oversized condition.

31. The system of claim 28, wherein to determine whether the oversized condition exists for the at least one electrical system, the computer-readable instructions, when executed by the processor, further cause the processor to:

identify the seasonal subset of the energy usage data corresponding to a heating season;

apply a third order low-pass filter to the subset to generate a filtered signal;

compare the filtered signal to unfiltered energy usage data corresponding to the subset, to generate ratio data; and based upon the ratio data and the turn on and turn off times for the given heating season, setting the oversized condition.

32. The system of claim 28, wherein the computer-readable instructions, when executed by the processor, further cause the processor to:

automatically determine turn on times, turn off times, and turn on wattage, for the at least one electrical system, derived from the energy usage data;

generate a system turn on time building marker, a system turn off time building marker, and a system turn on wattage building marker of the plurality of building markers by:

producing a derivative dataset defining changes in energy usage between timestamps of the energy usage data; and setting the system turn on wattage building marker based on energy usage changes occurring at the turn on times;

setting the system turn on time building marker based on changes of the turn on times; and setting the system turn off times building marker based on changes of the turn off times.

33. The system of claim 28, wherein the computer-readable instructions, when executed by the processor, further cause the processor to:

determining that the at least one electrical system is active when the target building is unoccupied based on the energy usage data;

determining a temperature setpoint based on weather data including ambient temperatures; and setting the reschedule condition according to the determined temperature setpoint of the target building.

34. The system of claim 28, wherein the computer-readable instructions, when executed by the processor, further cause the processor to:

generate an energy usage change building marker by:

separating the energy usage data into a plurality of single-year subsets;

for each year represented in the plurality of single-year subsets, identifying significant change-points of the energy usage data that occurred during that year;

determining that a correlation between first and second significant change points of the significant change points is lower than a predetermined threshold;

flagging the first and second significant change points as corresponding to a retrofit time for the target building; and setting the energy usage change building marker according to the first and second significant change points.

35. The system of claim 28, wherein the computer-readable instructions, when executed by the processor, further cause the processor to:

generate a heating type building marker and a cooling type building marker by:

removing datapoints from the energy usage data and the weather data corresponding to holidays and weekends to produce modified energy usage data and modified weather data;

applying a piecewise linear regression model to the modified energy usage data and time-series exterior temperature data of the modified weather data to produce a heating season trendline and a cooling season trendline;

determining a first slope of the heating season trendline;

determining a second slope of the cooling season trendline;

comparing the first slope to a first predetermined threshold to determine the heating type of the target building;

comparing the second slope to a second predetermined threshold to determine the cooling type of the target building;

setting the heating type building marker according to the determined heating type; and setting the cooling type building marker according to the determined cooling type.

36. The system of claim 28, wherein the computer-readable instructions, when executed by the processor, further cause the processor to:

dividing the energy usage data into subsets;

applying hierarchical clustering to the subsets to produce cluster data;

identifying abnormal days corresponding to outlier energy usage based on the cluster data; and setting the abnormal condition according to the identified abnormal days.

37. The system of claim 28, wherein the computer-readable instructions, when executed by the processor, further cause the processor to:

generate an effective R-value building marker by:

disaggregating the energy usage data into a heating/cooling dataset and a load dataset;

determining an interior heating load for a selected time period based on the load dataset, wherein the selected time period corresponds to a time period during which an interior temperature of the target building is substantially unchanging;

determining an amount of energy being removed from air-conditioned space of the target building based on the heating/cooling dataset for the selected time period;

determining an exterior temperature of the target building for the selected time period based on the weather data;

estimating the interior temperature of the target building for the selected time period within a predetermined range; and setting the effective R-value building marker based on the amount of energy being removed, the interior heating load, the exterior temperature, and the interior temperature.

* * * * *